US012705602B1

(12) United States Patent
Dande et al.

(10) Patent No.: US 12,705,602 B1
(45) Date of Patent: Aug. 11, 2026

(54) AUTO GENERATE AND PROCESS ELECTRONIC CONTENT IN A SECURED WAY USING GEN AI AND HASH-BASED ATTRIBUTE LEVEL SECURITY IN A DeFi NETWORK

(71) Applicant: Bank of America Corporation, Charlotte, NC (US)

(72) Inventors: Pratap Dande, Saint Johns, FL (US); Shailendra Singh, Maharashtra (IN); Ramesh Bhavana, Frisco, TX (US); Dasu Maddukuri, Frisco, TX (US); Ronak Maheshkumar Shah, Charlotte, NC (US); Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/240,459

(22) Filed: Jun. 17, 2025

(51) Int. Cl.
*G06Q 20/36* (2012.01)
*H04L 9/32* (2006.01)
*H04L 41/0823* (2022.01)

(52) U.S. Cl.
CPC ....... *G06Q 20/3672* (2013.01); *H04L 9/3213* (2013.01); *H04L 9/3236* (2013.01); *H04L 41/0823* (2013.01); *G06Q 2220/00* (2013.01); *H04L 2209/56* (2013.01)

(58) Field of Classification Search
CPC ............ G06Q 20/3672; G06Q 2220/00; H04L 9/3213; H04L 9/3236; H04L 41/0823; H04L 2209/56
See application file for complete search history.

(56) References Cited

U.S. PATENT DOCUMENTS 10,812,455 B1 10/2020 Reissner et al.
12,321,583 B1 * 6/2025 Cwalina ................. G06F 16/86
(Continued)

FOREIGN PATENT DOCUMENTS

CN 117608571 A * 2/2024 .............. G06F 8/38
CN 117786264 A * 3/2024
(Continued)

*Primary Examiner* — Chunling Ding
(74) *Attorney, Agent, or Firm* — Banner & Witcoff, Ltd.

(57) ABSTRACT

Generating and processing electronic content in a decentralized finance network using distributed ledger technology is disclosed. Transaction security and efficiency is enhanced by integrating generative AI with hash-based security and NFTs in a DeFi network. User devices capture a customer prompt specifying a financial transaction request, which a generative AI module analyzes to extract attributes and determine a transaction type. A webhook transmits the attributes to distributed nodes, and a security module generates a hash-based security token for attribute-level security. A content assembly module creates a JSON object based on node responses and smart contract rules. The generative artificial intelligence module generates a dynamic electronic form, prepopulating fields with network data. User input populates the form, which a tokenization module mints as a non-fungible token with a validity period. Nodes process the non-fungible token to execute the transaction, using the security token for verification, with results recorded on the ledger.

20 Claims, 9 Drawing Sheets

(56) References Cited

U.S. PATENT DOCUMENTS

| | | | | |
|---|---|---|---|---|
| 2013/0185196 | A1* | 7/2013 | Kadur | G06Q 20/401 705/39 |
| 2016/0283920 | A1 | 9/2016 | Fisher et al. | |
| 2016/0292672 | A1 | 10/2016 | Fay et al. | |
| 2020/0052880 | A1* | 2/2020 | Bathen | H04L 63/102 |
| 2024/0403870 | A1* | 12/2024 | Wright | H04L 9/0825 |
| 2025/0021982 | A1* | 1/2025 | Devaraj | G06Q 20/4016 |
| 2025/0181816 | A1* | 6/2025 | Haque | G06F 40/103 |
| 2025/0342048 | A1* | 11/2025 | Mattison | G06F 3/167 |
| 2026/0065272 | A1* | 3/2026 | Jordan | G06Q 20/401 |

FOREIGN PATENT DOCUMENTS

| | | | | | |
|---|---|---|---|---|---|
| CN | 120088007 | A | * | 6/2025 | H04L 67/104 |
| EP | 3293687 | B1 | * | 2/2025 | G06F 21/73 |
| WO | WO-2020251598 | A1 | * | 12/2020 | G06Q 40/03 |
| WO | WO-2024049265 | A1 | * | 3/2024 | G06F 21/64 |

* cited by examiner

AUTO GENERATE AND PROCESS ELECTRONIC CONTENT IN A SECURED WAY USING GEN AI AND HASH-BASED ATTRIBUTE LEVEL SECURITY IN A DeFi NETWORK

TECHNICAL FIELD

The inventions disclosed herein pertain to methods and systems for generating and processing electronic content in a secure manner within distributed computing environments, specifically focusing on decentralized networks that leverage distributed ledger technology for transactions. These inventions encompass techniques for dynamically creating electronic forms or content using generative artificial intelligence, securing data attributes through hash-based tokenization, and ensuring data integrity and ownership via non-fungible tokens. Additionally, the inventions involve the integration of smart contracts to manage rules, conditions, and workflows, as well as the extraction and processing of user prompts to facilitate interactions across distributed nodes, aligning with technologies that enable secure data processing, cryptography, and distributed system architectures.

DESCRIPTION OF THE RELATED ART

In decentralized networks, processing high-value transactions such as applications or claims often requires collecting extensive data from customers to meet regulatory and operational requirements. These transactions demand precise and structured information to ensure compliance with anti-money laundering regulations and other oversight mandates. However, customers frequently need to provide additional information beyond what is requested in standardized forms, such as updates to business details, changes in ownership, or other contextual data relevant to the transaction. This supplementary information is typically submitted through unstructured comment fields, which creates significant challenges for automated processing systems. The lack of structure in these fields leads to misinterpretation or incomplete understanding of the provided data, hindering the ability of institutions to process transactions efficiently.

The reliance on comment fields for additional customer information introduces operational inefficiencies. When customers include critical details in these unstructured formats, applications within the transaction processing lineage often fail to interpret the data correctly. This misinterpretation can result in transactions being delayed, dropped, or stuck in the system, as the applications are not designed to parse free-text inputs effectively. As a result, operations teams must manually intervene, reaching out to customers to clarify the information provided in the comments. This manual process is time-consuming and resource-intensive, increasing the operational burden on financial institutions and delaying transaction completion, which can frustrate customers and erode trust in the system.

Another significant issue arises from the variability in data standards across decentralized finance networks. Different nodes or entities within these networks, such as financial institutions, regulatory bodies, or government agencies, often use disparate naming conventions and formats for data elements. This lack of standardization complicates the integration and processing of customer-provided data, particularly when additional attributes are submitted. Without a unified approach to handling these attributes, applications struggle to align the data with the specific requirements of each node, leading to errors and inconsistencies in transaction processing. The absence of a mechanism to standardize and secure these additional attributes exacerbates the problem, making it difficult to ensure that all relevant information is accurately captured and utilized.

The manual intervention required to resolve issues with unstructured data also introduces the risk of human error. Operations teams, tasked with interpreting customer comments, may misinterpret or overlook critical details, leading to incorrect data entry or incomplete transaction records. These errors can have significant consequences, including regulatory non-compliance, financial losses, or disputes with customers. Furthermore, the repetitive nature of manual data clarification increases the likelihood of fatigue among operations staff, further compounding the potential for mistakes. The lack of an automated system to handle additional customer attributes in a structured manner perpetuates these risks, undermining the reliability of transaction processing in decentralized finance networks.

Data integrity poses another challenge in the processing of customer information within decentralized finance systems. As data passes through multiple applications and nodes in the transaction lineage, it is subject to aggregation, consolidation, or truncation. These transformations can alter the original information provided by the customer, making it difficult to verify the accuracy of the data at later stages of processing. Without a mechanism to preserve the integrity of the customer's input, financial institutions face challenges in maintaining an auditable trail of the data's journey. This lack of traceability can complicate regulatory audits and increase the risk of disputes over the authenticity of the information used in transaction decisions.

The absence of a secure method to handle additional customer attributes also raises concerns about data privacy and security. In decentralized finance networks, where data is shared across multiple entities, ensuring that sensitive customer information is protected is paramount. Unstructured comment fields, which often contain sensitive details, are not inherently secure and may be vulnerable to unauthorized access or manipulation. The lack of attribute-level security measures means that financial institutions cannot guarantee the confidentiality of customer data, potentially exposing customers to privacy breaches and undermining confidence in the decentralized finance system.

The inefficiencies caused by unstructured data and manual processes also have broader implications for customer experience. Customers expect seamless and rapid transaction processing, particularly in high-value financial contexts such as loans or claims. However, the need for back-and-forth communication to clarify comment-based information creates delays and frustration. Customers may perceive these delays as a lack of competence or reliability on the part of the financial institution, which can damage relationships and lead to lost business. The inability to provide a streamlined process for submitting and processing additional information detracts from the overall user experience, making it a significant pain point for both customers and institutions.

The challenges described are compounded by the dynamic nature of customer information. In many cases, customers need to provide updates to their details, such as changes in business structure, contact information, or ownership status, which are critical for regulatory compliance and transaction approval. However, existing systems are not equipped to handle these dynamic updates in a structured and automated manner. The reliance on static forms and comment fields limits the ability of financial institutions to capture and process these changes efficiently, leading to further delays and operational inefficiencies. This gap in functionality highlights the need for a more flexible and responsive approach to data collection in decentralized finance networks.

The problems outlined are not limited to customer-facing interactions but also affect the interoperability of decentralized finance networks. As these networks involve multiple entities, each with its own systems and requirements, the lack of a standardized and secure method for handling additional customer attributes creates friction in cross-entity collaboration. Transactions that require input from multiple nodes, such as those involving regulatory approvals or inter-institutional agreements, are particularly vulnerable to delays and errors caused by inconsistent data handling. This lack of interoperability undermines the potential of decentralized finance to provide efficient and transparent financial services, limiting its adoption and effectiveness.

The long-felt and unmet need for a solution to these problems stems from the growing complexity and scale of decentralized finance networks. For years, institutions have struggled to balance the need for comprehensive customer data with the limitations of existing data collection and processing systems. The reliance on manual processes and unstructured comment fields has persisted due to the absence of a technology capable of dynamically capturing, standardizing, and securing additional customer attributes in a decentralized environment. As decentralized finance networks expand and regulatory requirements become more stringent, the demand for an automated, secure, and interoperable solution has intensified. This need has remained unmet, as traditional approaches have failed to address the unique challenges of decentralized systems, leaving financial institutions and customers grappling with inefficiencies, errors, and security risks.

SUMMARY OF THE INVENTION

The inventions disclosed herein provide comprehensive methods and systems for generating and processing electronic content within decentralized finance (DeFi) networks, utilizing distributed ledger technology to ensure security, transparency, and efficiency. The process initiates when a customer interacts with the system through a device, such as a smartphone, tablet, or spatial computing platform, by providing a prompt in the form of voice, text, or other input modalities. This prompt, which could pertain to financial transactions like loan applications, claims processing, account openings, or regulatory compliance updates, triggers the system to collect all necessary attributes required to fulfill the customer's request. The system improves network efficiency by optimizing webhook payload transmission based on real-time blockchain consensus data, reducing latency in multi-node DeFi transactions, and is designed to capture these attributes in a structured format, accommodating the diverse and dynamic nature of financial data requirements across various transaction types and entities within the network.

Upon receiving the customer's prompt, the system can employ advanced natural language processing and/or generative artificial intelligence to analyze the input and extract its context and intent. This analysis facilitates determining the specific data elements and attributes needed to process the request. For instance, a customer requesting a loan might need to provide income details, collateral information, or business ownership updates, while a regulatory compliance prompt might require updated contact information or organizational changes. The system parses the prompt to identify these requirements and prepares a webhook call to relay the contextual attributes to distributed nodes within the decentralized finance network, ensuring that the relevant entities are engaged in the transaction process.

The webhook call serves as a unidirectional communication mechanism, transmitting the payload of contextual attributes to nodes associated with various platforms, such as lending, claims, account management, or regulatory oversight. These nodes may represent financial institutions, government agencies, regulatory bodies, or other participants in the decentralized finance ecosystem. Each node contributes specific data elements or rules relevant to the transaction, based on its role and requirements. The webhook payload is structured to include metadata about the attributes, enabling the nodes to understand the context of the request and respond with the necessary information to construct the electronic content. This distributed approach ensures interoperability and scalability, allowing the system to handle complex, multi-entity transactions.

One aspect of the invention is its hash-based security mechanism, which provides attribute-level protection for the customer's data. The system generates a hash-based security table, distributed across the network's nodes in the form of a token. This token contains a distributed hash table range for each attribute, along with a corresponding attribute list. Each participating entity selects a range of addresses to manage, and every attribute is assigned a unique hash address based on its distinct properties, such as its data type or content. This granular security model ensures that each attribute is individually protected, preventing unauthorized access or tampering as the data is processed across the network. The token is immutable and verifiable, enhancing the overall security of the system.

The decentralized finance network, built on distributed ledger technology, facilitates the assembly of electronic content by coordinating the interactions between nodes. The customer's prompt is relayed to the relevant nodes, which collaborate to generate dynamic security measures for each attribute. These measures are compiled into a JSON format, which provides a standardized and flexible representation of the attributes and their associated security properties. The use of JSON ensures that the data is easily interpretable by different applications and platforms within the network, regardless of their specific data standards or naming conventions. This structured format maintains data consistency and enables seamless integration across the decentralized ecosystem.

Smart contracts can be utilized in the invention, serving as the backbone for managing the rules, conditions, logic, and workflows required to generate electronic forms or content. These smart contracts are hosted on the distributed ledger, ensuring transparency, immutability, and accessibility to all authorized entities. Each smart contract defines the parameters for a specific transaction type, such as the mandatory data fields for a loan application or the verification steps for a claims process. The generative artificial intelligence interacts with these smart contracts to assemble the necessary components, tailoring the electronic content to the customer's request while adhering to the network's predefined rules.

Generative artificial intelligence enables dynamic creation of electronic forms or content on the customer's device. Unlike traditional systems that rely on predefined templates, this approach allows the system to adapt to the unique context of each prompt. For example, a customer requesting to open a new account might receive a form with fields tailored to their existing relationship with the network, while a new customer might receive a more comprehensive form with additional fields. The generative artificial intelligence analyzes the prompt, consults the smart contracts, and incorporates input from relevant nodes to construct the form in real time, ensuring that it captures all required attributes in a structured and user-friendly format.

The electronic form or content is rendered directly on the customer's device, providing a seamless and intuitive interface for data entry. The form is designed to minimize errors and misinterpretations by presenting the attributes in a clear and organized manner. For instance, fields may be labeled with specific instructions or validations to ensure that the customer provides accurate and complete information. The generative artificial intelligence also supports autofill capabilities, prepopulating fields with known data, such as the customer's contact details or account history, based on information available in the network. Customers can review and modify these prepopulated fields, ensuring accuracy while reducing the time and effort required to complete the form.

Once the customer submits the completed form, the invention ensures the integrity and ownership of the data by minting it as a non-fungible token on the distributed ledger. This non-fungible token acts as a unique digital certificate, verifying the authenticity and reliability of the captured data. The token is linked to the specific electronic form and its associated attributes, creating an immutable record that can be referenced by all relevant entities in the network. This process establishes a clear chain of custody for the data, enabling traceability and accountability throughout the transaction lifecycle. The non-fungible token also serves as proof of ownership, ensuring that the customer retains control over their submitted information.

The filled electronic form, now encapsulated as a non-fungible token, is transmitted to the decentralized finance network for processing. Each node in the network uses the hash-based security table token to interpret the attributes of the non-fungible token, ensuring that the data is processed accurately and securely. This approach allows the network to handle complex transactions that require input from multiple entities, such as regulatory approvals or inter-institutional agreements. The non-fungible token's immutability ensures that the data remains unchanged as it moves through the network, reducing the risk of errors or unauthorized modifications.

The invention's ability to manage temporal validity is another feature, addressed through the use of smart contracts. Each non-fungible token may have a defined validity period, after which it transitions to a passive state. For example, a token representing a customer's know-your-customer (KYC) data may be valid for six months, after which the customer must submit updated information to create a new token. The smart contract enforces these temporal properties, ensuring that entities rely on current and accurate data for transaction processing. This feature is particularly valuable in dynamic financial environments, where customer information, such as addresses or business structures, may change frequently.

The system's flexibility in handling both individual and entity-level users enhances its applicability across diverse scenarios. Individual customers can use the system to submit prompts for personal transactions, such as applying for a loan or updating compliance data. Similarly, entities such as financial institutions or regulatory agencies can initiate prompts to generate electronic forms for inter-institutional activities, such as data sharing or regulatory reporting. The decentralized nature of the system ensures that these interactions are secure and efficient, regardless of the user type, supporting both intra-organizational and cross-organizational workflows.

The invention's use of non-fungible tokens to secure customer data provides a robust mechanism for maintaining data ownership and integrity. Each token is stored in the customer's profile on the distributed ledger, creating a comprehensive record of their interactions with the network. Over time, a customer may accumulate multiple non-fungible tokens, each representing a different transaction, such as an account opening, loan application, or compliance update. These tokens facilitate audits and compliance checks by providing a verifiable and immutable record of the customer's data, streamlining regulatory oversight and dispute resolution.

The webhook-based communication model ensures real-time interaction between the customer's device and the distributed nodes. By triggering webhook calls immediately upon receiving the customer's prompt, the system minimizes latency in the generation of electronic forms. The webhook payload includes detailed contextual attributes, enabling the nodes to contribute accurate and relevant information to the form's creation. This real-time coordination is essential for maintaining the efficiency of the transaction process, particularly in high-value financial contexts where delays can impact customer satisfaction and operational outcomes.

The distributed ledger technology underpinning the invention ensures that all transactions and data interactions are transparent and tamper-proof. The ledger serves as a single source of truth for the network, recording the creation of electronic forms, the minting of non-fungible tokens, and the execution of smart contracts. This transparency fosters trust among the network's entities, as all participants have access to the same immutable record. The distributed ledger also supports efficient data sharing, enabling nodes to collaborate seamlessly without relying on centralized intermediaries.

The invention's autofill capabilities enhance user convenience and reduce the likelihood of errors. By leveraging existing data within the network, the generative artificial intelligence can prepopulate fields with accurate information, such as the customer's name, address, or account details. Customers can validate or modify this information as needed, ensuring that the submitted data is correct. This feature is particularly beneficial for repeat customers, as it streamlines the data submission process and minimizes the need for redundant data entry, improving the overall user experience.

The system's design supports a wide range of use cases within decentralized finance networks, demonstrating its versatility and scalability. For example, customers can use the system to open digital accounts, submit loan applications, provide crypto assets as collateral, or update regulatory compliance information. In each case, the system generates a tailored electronic form based on the customer's prompt and the requirements of the relevant entities. The resulting non-fungible token ensures that the submitted data is secure and verifiable, enabling rapid and reliable transaction processing across diverse financial scenarios.

The invention's ability to integrate generative artificial intelligence, hash-based security, smart contracts, and non-fungible tokens creates a comprehensive solution for managing customer data in decentralized finance networks. The generative artificial intelligence enables dynamic and context-aware form generation, while the hash-based security ensures granular protection of data attributes. Smart contracts provide a flexible and transparent framework for managing transaction rules, and non-fungible tokens guarantee data integrity and ownership. Together, these components address the unique challenges of decentralized finance, such as data variability, security, and interoperability.

The decentralized finance network's ability to handle dynamic and distributed data requirements distinguishes the invention from traditional systems. By eliminating the reliance on static templates and centralized processing, the system provides a scalable and adaptable solution for modern financial ecosystems. Its support for both small-scale and large-scale applications makes it suitable for a wide range of decentralized finance networks, from single-institution environments to global, multi-entity collaborations. This flexibility positions the invention as a transformative tool for the future of financial transaction processing.

The invention's emphasis on user-centric design ensures that customers and entities can interact with the system intuitively and efficiently. The generation of electronic forms on the customer's device, combined with autofill capabilities and clear field validations, simplifies the data submission process. The use of non-fungible tokens to secure and store data provides customers with confidence in the integrity of their information, while the distributed ledger ensures that entities can trust the authenticity of the data they process. This balance of usability and security enhances the overall effectiveness of the system.

In light of the preceding discussion, the following identifies various sample embodiments of the present disclosure to establish a basic understanding of its various components. This summary is not exhaustive, nor does it limit the illustrative embodiments of the inventions described in this document. It is not intended to identify the most essential features or steps of the disclosure, nor to define its scope. Instead, as would be recognized by someone skilled in the field, it seeks to introduce certain concepts of the disclosure in a clear and simple way, acting as a preface to the more detailed explanation that follows. Throughout this application, the specification offers thorough written descriptions of the inventions, including exemplary, non-exhaustive, and non-limiting methods and processes for making and using the inventions. These descriptions are expressed in complete, clear, concise, and precise terms, allowing those skilled in the art to implement and utilize various embodiments of the inventions without undue experimentation.

In some arrangements, a method for generating and processing electronic content in a decentralized finance network involves capturing a customer prompt provided through an input modality by a user device, where the customer prompt specifies a financial transaction request. A generative artificial intelligence module analyzes the customer prompt to extract a set of attributes and determine a transaction type associated with the financial transaction request. A webhook transmits a payload, which includes the set of attributes and the transaction type, to a plurality of distributed nodes in the decentralized finance network, with each node associated with a platform configured to process a specific aspect of the financial transaction request. A security module generates a hash-based security token containing a distributed hash table that maps each attribute in the set of attributes to a unique hash address.

The hash-based security token is distributed across the plurality of distributed nodes to enable attribute-level security for the set of attributes. A content assembly module assembles a JSON object containing the set of attributes based on responses from the plurality of distributed nodes and rules defined in a smart contract hosted on a distributed ledger. The generative artificial intelligence module generates a dynamic electronic form on the user device, where the dynamic electronic form includes fields corresponding to the set of attributes in the JSON object. The user device receives user input populating the fields of the dynamic electronic form. A tokenization module mints a non-fungible token representing the populated dynamic electronic form, where the non-fungible token includes the set of attributes and a validity period. The plurality of distributed nodes processes the non-fungible token to execute the financial transaction request, using the hash-based security token to verify the set of attributes.

In some arrangements, the method is modified such that the input modality through which the user device captures the customer prompt includes at least one of voice input, text input, or gesture input. This modification allows the system to accommodate various forms of user interaction, ensuring flexibility in how customers submit their financial transaction requests.

In some arrangements, the method is further refined by the generative artificial intelligence module classifying an intent of the customer prompt. The generative artificial intelligence module maps the intent to the set of attributes required for the transaction type. This step ensures that the intent behind the customer prompt is accurately interpreted and translated into the necessary data attributes for processing.

In some arrangements, the payload transmitted via the webhook in the method described above further includes metadata specifying the intent of the customer prompt. This addition enhances the context provided to the distributed nodes, enabling more precise responses and coordination among the platforms processing the financial transaction request.

In some arrangements, the method further specifies that generating the hash-based security token involves assigning a distributed hash table range to each attribute based on its data type. This customization of the security token ensures that attributes are organized and protected according to their specific characteristics, enhancing the security and efficiency of data handling.

In some arrangements, the method includes the smart contract defining workflow rules that specify a sequence of operations for processing the set of attributes. These rules provide a structured framework for the transaction process, ensuring that the distributed nodes follow a consistent and predefined procedure.

In some arrangements, the method is enhanced by the generative artificial intelligence module prepopulating at least one field in the dynamic electronic form with data retrieved from the decentralized finance network. The generative artificial intelligence module also validates user input against the prepopulated data, improving the accuracy and efficiency of data entry by leveraging existing information.

In some arrangements, the method determines the validity period of the non-fungible token based on the transaction type. This ensures that the token's lifespan is tailored to the specific requirements of the financial transaction, accommodating varying regulatory or operational needs.

In some arrangements, the method further involves a validation module monitoring a current timestamp against the validity period of the non-fungible token. If the validity period is exceeded, the validation module transitions the non-fungible token to a passive state, ensuring that outdated tokens are not used for transaction processing.

In some arrangements, the method includes processing the non-fungible token by recording transaction results on the distributed ledger. This step ensures transparency and traceability, maintaining an immutable record of the transaction's outcome for all network participants.

In some arrangements, a comprehensive method for generating and processing electronic content in a decentralized finance network involves capturing a customer prompt provided through an input modality selected from voice input, text input, or gesture input by a user device, where the customer prompt specifies a financial transaction request. A generative artificial intelligence module analyzes the customer prompt to extract a set of attributes, classify an intent of the customer prompt, and determine a transaction type associated with the financial transaction request. The generative artificial intelligence module maps the intent to the set of attributes required for the transaction type. A webhook transmits a payload, which includes the set of attributes, the transaction type, and metadata specifying the intent, to a plurality of distributed nodes in the decentralized finance network, with each node associated with a platform configured to process a specific aspect of the financial transaction request.

A security module generates a hash-based security token containing a distributed hash table that maps each attribute in the set of attributes to a unique hash address, where a distributed hash table range is assigned to each attribute based on its data type. The hash-based security token is distributed across the plurality of distributed nodes to enable attribute-level security for the set of attributes. A content assembly module assembles a JSON object containing the set of attributes based on responses from the plurality of distributed nodes and workflow rules defined in a smart contract hosted on a distributed ledger, where the workflow rules specify a sequence of operations for processing the set of attributes.

The generative artificial intelligence module generates a dynamic electronic form on the user device, where the dynamic electronic form includes fields corresponding to the set of attributes in the JSON object. The generative artificial intelligence module prepopulates at least one field in the dynamic electronic form with data retrieved from the decentralized finance network and validates user input against the prepopulated data. The user device receives user input populating the fields of the dynamic electronic form. A tokenization module mints a non-fungible token representing the populated dynamic electronic form, where the non-fungible token includes the set of attributes and a validity period based on the transaction type. A validation module monitors a current timestamp against the validity period and transitions the non-fungible token to a passive state if the validity period is exceeded. The plurality of distributed nodes processes the non-fungible token to execute the financial transaction request, using the hash-based security token to verify the set of attributes. The plurality of distributed nodes records transaction results on the distributed ledger, and the validation module notifies the plurality of distributed nodes of the non-fungible token's passive state if transitioned.

In some arrangements, a system for generating and processing electronic content in a decentralized finance network includes a user device that captures a customer prompt provided through an input modality, where the customer prompt specifies a financial transaction request. A generative artificial intelligence module analyzes the customer prompt to extract a set of attributes and determine a transaction type associated with the financial transaction request. A webhook module transmits a payload, which includes the set of attributes and the transaction type, to a plurality of distributed nodes in the decentralized finance network, with each node associated with a platform configured to process a specific aspect of the financial transaction request.

A security module generates a hash-based security token containing a distributed hash table that maps each attribute in the set of attributes to a unique hash address. A distribution module distributes the hash-based security token across the plurality of distributed nodes to enable attribute-level security for the set of attributes. A content assembly module assembles a JSON object containing the set of attributes based on responses from the plurality of distributed nodes and rules defined in a smart contract hosted on a distributed ledger. A form generation module generates a dynamic electronic form on the user device, where the dynamic electronic form includes fields corresponding to the set of attributes in the JSON object. An input module receives user input populating the fields of the dynamic electronic form. A tokenization module mints a non-fungible token representing the populated dynamic electronic form, where the non-fungible token includes the set of attributes and a validity period. A processing module processes the non-fungible token across the plurality of distributed nodes to execute the financial transaction request, using the hash-based security token to verify the set of attributes.

In some arrangements, the system includes a generative artificial intelligence module that is further configured to classify an intent of the customer prompt, enabling the system to better understand the purpose behind the financial transaction request.

In some arrangements, the system further configures the generative artificial intelligence module to map the intent of the customer prompt to the set of attributes required for the transaction type, ensuring that the necessary data is identified and collected for processing.

In some arrangements, the system modifies the webhook module to include metadata specifying the intent of the customer prompt in the payload, providing additional context to the distributed nodes for more accurate transaction processing.

In some arrangements, the system further configures the security module to assign a distributed hash table range to each attribute based on its data type when generating the hash-based security token, enhancing the organization and security of attribute-level data protection.

In some arrangements, the system includes a smart contract that incorporates workflow rules specifying a sequence of operations for processing the set of attributes, providing a structured and consistent approach to transaction execution.

In some arrangements, the system configures the form generation module to prepopulate at least one field in the dynamic electronic form with data retrieved from the decentralized finance network, streamlining the data entry process for users.

In some arrangements, the system further configures the tokenization module to determine the validity period of the non-fungible token based on the transaction type, ensuring that the token's lifespan aligns with the specific needs of the financial transaction.

In some arrangements, the system includes a validation module that monitors a current timestamp against the validity period of the non-fungible token. The validation module transitions the non-fungible token to a passive state if the validity period is exceeded and notifies the plurality of distributed nodes of the non-fungible token's passive state. A ledger module records transaction results on the distributed ledger. The generative artificial intelligence module validates user input against prepopulated data in the dynamic electronic form. The form generation module applies field-specific validation rules derived from the smart contract to ensure the accuracy of user input. The webhook module receives responses from the plurality of distributed nodes confirming receipt of the hash-based security token. The processing module verifies the integrity of the non-fungible token by comparing its attributes against the hash-based security token before executing the financial transaction request. This comprehensive configuration ensures robust security, accuracy, and transparency throughout the transaction process.

In some arrangements, a method for generating and processing electronic content in a decentralized finance network involves capturing a customer prompt provided through an input modality by a user device, where the customer prompt specifies a financial transaction request. A generative artificial intelligence module analyzes the customer prompt to extract a set of attributes and determine a transaction type associated with the financial transaction request. A webhook transmits a payload, which includes the set of attributes and the transaction type, to a plurality of distributed nodes in the decentralized finance network, with each node associated with a platform configured to process a specific aspect of the financial transaction request. Network latency is optimized by prioritizing webhook payload transmission to nodes based on real-time blockchain consensus data. A security module generates a hash-based security token containing a distributed hash table that maps each attribute in the set of attributes to a unique hash address. The hash-based security token is distributed across the plurality of distributed nodes to enable attribute-level security for the set of attributes.

A content assembly module assembles a JSON object containing the set of attributes based on responses from the plurality of distributed nodes and rules defined in a smart contract hosted on a distributed ledger. The generative artificial intelligence module generates a dynamic electronic form on the user device, where the dynamic electronic form includes fields corresponding to the set of attributes in the JSON object. The generative artificial intelligence module dynamically generates the dynamic electronic form with fields tailored to a user profile retrieved from the distributed ledger in real-time based on the transaction type. The user device receives user input populating the fields of the dynamic electronic form. A tokenization module mints a non-fungible token representing the populated dynamic electronic form, where the non-fungible token includes the set of attributes and a validity period. The plurality of distributed nodes processes the non-fungible token to execute the financial transaction request, using the hash-based security token to verify the set of attributes.

In some arrangements, the method is modified such that the input modality through which the user device captures the customer prompt includes at least one of voice input, text input, or gesture input. This modification ensures flexibility in how customers interact with the system, accommodating diverse user preferences and technological capabilities.

In some arrangements, the method is further refined by the generative artificial intelligence module classifying an intent of the customer prompt using a transformer-based neural network model fine-tuned on decentralized finance transaction data. The generative artificial intelligence module maps the intent to the set of attributes required for the transaction type. This step enhances the accuracy of intent interpretation, leveraging specialized AI to align user requests with necessary transaction data.

In some arrangements, the payload transmitted via the webhook in the method described above further includes metadata specifying the intent of the customer prompt. This addition provides additional context to the distributed nodes, enabling more precise and coordinated processing of the financial transaction request across the network.

In some arrangements, the method described above further specifies that generating the hash-based security token involves assigning a distributed hash table range to each attribute based on its data type. This customization ensures that attributes are organized and protected according to their specific characteristics, enhancing the security and efficiency of data handling within the decentralized network.

In some arrangements, the method includes the smart contract defining workflow rules that specify a sequence of operations for processing the set of attributes. These rules provide a structured framework for transaction execution, ensuring consistency and compliance with predefined logic across the distributed nodes.

In some arrangements, the method is enhanced by the generative artificial intelligence module prepopulating at least one field in the dynamic electronic form with data retrieved from the decentralized finance network. The generative artificial intelligence module validates user input against the prepopulated data, improving data accuracy and reducing manual entry errors by leveraging existing network information.

In some arrangements, the method determines the validity period of the non-fungible token based on the transaction type. This ensures that the token's lifespan aligns with the specific requirements of the financial transaction, accommodating varying regulatory or operational needs.

In some arrangements, the method further involves a validation module monitoring a current timestamp against the validity period of the non-fungible token using a blockchain-based event listener that triggers real-time notifications to nodes. If the validity period is exceeded, the validation module transitions the non-fungible token to a passive state, preventing outdated tokens from being used in transaction processing and maintaining data relevance.

In some arrangements, the method includes processing the non-fungible token by recording transaction results on the distributed ledger. This step ensures transparency and traceability, maintaining an immutable record of the transaction's outcome for all network participants, critical for audits and compliance.

In some arrangements, a comprehensive method for generating and processing electronic content in a decentralized finance network involves capturing a customer prompt provided through an input modality selected from voice input, text input, or gesture input by a user device, where the customer prompt specifies a financial transaction request. A generative artificial intelligence module analyzes the customer prompt to extract a set of attributes, classify an intent of the customer prompt, and determine a transaction type associated with the financial transaction request. The generative artificial intelligence module maps the intent to the set of attributes required for the transaction type. A webhook transmits a payload, which includes the set of attributes, the transaction type, and metadata specifying the intent, to a plurality of distributed nodes in the decentralized finance network, with each node associated with a platform configured to process a specific aspect of the financial transaction request. Network latency is optimized by prioritizing webhook payload transmission to nodes based on real-time blockchain consensus data. A security module generates a hash-based security token containing a distributed hash table that maps each attribute in the set of attributes to a unique hash address, where a distributed hash table range is assigned to each attribute based on its data type. The hash-based security token is distributed across the plurality of distributed nodes to enable attribute-level security for the set of attributes. A content assembly module assembles a JSON object containing the set of attributes based on responses from the plurality of distributed nodes and workflow rules defined in a smart contract hosted on a distributed ledger, where the workflow rules specify a sequence of operations for processing the set of attributes.

The generative artificial intelligence module generates a dynamic electronic form on the user device, where the dynamic electronic form includes fields corresponding to the set of attributes in the JSON object. The generative artificial intelligence module dynamically generates the dynamic electronic form with fields tailored to a user profile retrieved from the distributed ledger in real-time based on the transaction type. The generative artificial intelligence module prepopulates at least one field in the dynamic electronic form with data retrieved from the decentralized finance network and validates user input against the prepopulated data. The user device receives user input populating the fields of the dynamic electronic form. A tokenization module mints a non-fungible token representing the populated dynamic electronic form, where the non-fungible token includes the set of attributes and a validity period based on the transaction type. A validation module monitors a current timestamp against the validity period and dynamically adjusts the validity period of the non-fungible token based on real-time regulatory requirements retrieved from the distributed ledger. The validation module transitions the non-fungible token to a passive state if the validity period is exceeded. The plurality of distributed nodes processes the non-fungible token to execute the financial transaction request, using the hash-based security token to verify the set of attributes. The plurality of distributed nodes records transaction results on the distributed ledger, and the validation module notifies the plurality of distributed nodes of the non-fungible token's passive state if transitioned.

In some arrangements, a system for generating and processing electronic content in a decentralized finance network includes a user device configured to capture a customer prompt provided through an input modality, where the customer prompt specifies a financial transaction request. A generative artificial intelligence module is configured to analyze the customer prompt to extract a set of attributes and determine a transaction type associated with the financial transaction request. A webhook module is configured to transmit a payload, which includes the set of attributes and the transaction type, to a plurality of distributed nodes in the decentralized finance network, with each node associated with a platform configured to process a specific aspect of the financial transaction request.

The webhook module is further configured to optimize network latency by prioritizing payload transmission to nodes based on real-time blockchain consensus data. A security module is configured to generate a hash-based security token containing a distributed hash table that maps each attribute in the set of attributes to a unique hash address. A distribution module is configured to distribute the hash-based security token across the plurality of distributed nodes to enable attribute-level security for the set of attributes. A content assembly module is configured to assemble a JSON object containing the set of attributes based on responses from the plurality of distributed nodes and rules defined in a smart contract hosted on a distributed ledger. A form generation module is configured to generate a dynamic electronic form on the user device, where the dynamic electronic form includes fields corresponding to the set of attributes in the JSON object.

The generative artificial intelligence module is further configured to dynamically generate the dynamic electronic form with fields tailored to a user profile retrieved from the distributed ledger in real-time based on the transaction type. The generative artificial intelligence module is further configured to employ a machine learning model trained on historical user interactions to optimize field placement and validation rules in the dynamic electronic form. An input module is configured to receive user input populating the fields of the dynamic electronic form. A tokenization module is configured to mint a non-fungible token representing the populated dynamic electronic form, where the non-fungible token includes the set of attributes and a validity period. A processing module is configured to process the non-fungible token across the plurality of distributed nodes to execute the financial transaction request, using the hash-based security token to verify the set of attributes.

In some arrangements, the system includes a generative artificial intelligence module that is further configured to classify an intent of the customer prompt, enabling the system to accurately interpret the purpose behind the financial transaction request.

In some arrangements, the system further configures the generative artificial intelligence module to map the intent of the customer prompt to the set of attributes required for the transaction type, ensuring that the necessary data is identified and collected for processing.

In some arrangements, the system modifies the webhook module to include metadata specifying a prioritized node routing sequence based on transaction type in the payload, optimizing the efficiency of data transmission to the distributed nodes. In some arrangements, the system further configures the security module to assign a [0076] distributed hash table range to each attribute based on its data type when generating the hash-based security token, enhancing the organization and security of attribute-level data protection.

In some arrangements, the system includes a smart contract that incorporates workflow rules specifying a sequence of operations for processing the set of attributes, providing a structured and consistent approach to transaction execution.

In some arrangements, the system configures the form generation module to prepopulate at least one field in the dynamic electronic form with data retrieved from the decentralized finance network, streamlining the data entry process for users.

In some arrangements, the system further configures the tokenization module to determine the validity period of the non-fungible token based on the transaction type, ensuring that the token's lifespan aligns with the specific needs of the financial transaction.

In some arrangements, the system includes a validation module configured to monitor a current timestamp against the validity period of the non-fungible token. The validation module is further configured to transition the non-fungible token to a passive state if the validity period is exceeded and to notify the plurality of distributed nodes of the non-fungible token's passive state. A ledger module is configured to record transaction results on the distributed ledger. The generative artificial intelligence module is further configured to validate user input against prepopulated data in the dynamic electronic form. The generative artificial intelligence module is further configured to adapt validation rules in real-time based on machine learning analysis of node response patterns. The form generation module is further configured to apply field-specific validation rules derived from the smart contract to ensure accuracy of user input. The webhook module is further configured to receive responses from the plurality of distributed nodes confirming receipt of the hash-based security token. The processing module is further configured to verify the integrity of the non-fungible token by comparing its attributes against the hash-based security token before executing the financial transaction request. This comprehensive configuration ensures robust security, accuracy, and transparency throughout the transaction process.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on non-transitory computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," "the," and "invention" used throughout the specification and claims should be interpreted to include their plural counterparts.

DETAILED DESCRIPTION

Figure 1:
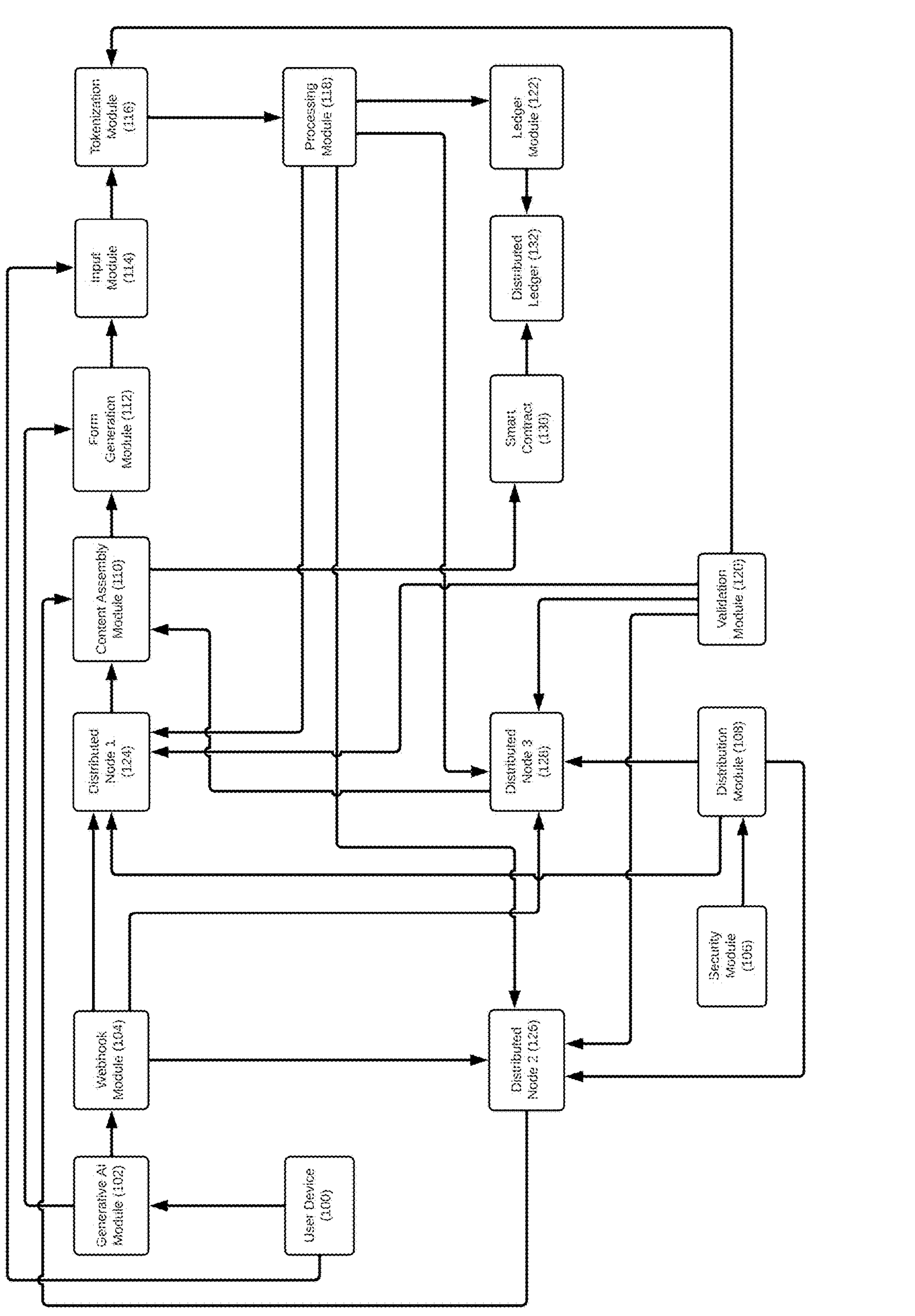
FIG. 1 is an exemplary system architecture diagram in accordance with one or more embodiments disclosed herein that illustrates the components and interconnections of a decentralized finance network for generating and processing electronic content, showing how the generative AI module and distributed nodes interact to process secure transactions. The diagram depicts the flow of data through various modules, distributed nodes, and a distributed ledger to facilitate secure and dynamic transaction processing.

The inventions disclosed herein provide sophisticated systems and methods for generating and processing electronic content within a decentralized finance (DeFi) network, leveraging distributed ledger technology (DLT) to ensure secure, transparent, and efficient financial transactions. At its core, the system enables users to initiate financial transaction requests through a user device, which captures prompts specifying actions such as loan applications, account openings, or compliance updates. These prompts, provided via diverse input modalities like voice, text, or gestures, serve as the starting point for a dynamic process that transforms user intent into structured, actionable data. The user device, acting as the primary interface, supports a range of platforms, from smartphones with native applications to spatial computing devices with immersive interfaces, ensuring accessibility across varied user preferences and technological environments.

Once a prompt is captured, a generative artificial intelligence module analyzes it to extract relevant attributes and determine the transaction type, laying the foundation for subsequent processing. This module employs advanced natural language processing to interpret the intent behind prompts, such as distinguishing a request for a business loan from a compliance data update. By mapping intents to predefined attribute schemas, the system ensures that all necessary data elements, like loan amounts or customer identities, are identified accurately. The generative artificial intelligence's ability to adapt to diverse prompts eliminates the need for static templates, enabling a flexible response to unique user needs and transaction contexts.

The extracted attributes and transaction type are packaged into a JSON payload, which is transmitted to distributed nodes via a webhook module. These nodes, representing platforms such as lending services, regulatory bodies, or government agencies, form the backbone of the decentralized network. Each node is equipped with blockchain client software, allowing it to process payloads and contribute platform-specific data, such as credit score requirements or identity verification results. The webhook module's real-time communication ensures that nodes receive comprehensive context, facilitating coordinated responses across the network's heterogeneous entities.

Security is a cornerstone of the invention, achieved through a hash-based security token generated by a dedicated security module. This token contains a distributed hash table that maps each attribute to a unique hash address, providing granular protection against unauthorized access or tampering. The token is distributed across nodes by a distribution module, which assigns hash ranges based on node roles, ensuring that sensitive data, like financial or identity attributes, is only accessible to authorized platforms. This attribute-level security, recorded on the blockchain, enhances trust and compliance in a decentralized environment where data sharing is prevalent.

The content assembly module aggregates node responses to create a structured JSON object, guided by rules defined in a smart contract hosted on the distributed ledger. Smart contracts play a pivotal role, encapsulating transaction parameters, conditions, and workflows, such as requiring a minimum credit score for loan approval or sequential validation steps for compliance updates. By executing these rules, the system ensures that the assembled content adheres to predefined logic, maintaining consistency across diverse transaction types. The JSON object serves as the blueprint for subsequent user interaction, encapsulating all necessary attributes in a standardized format.

The generative artificial intelligence module then generates a dynamic electronic form on the user device, with fields corresponding to the JSON object's attributes. This form is tailored to the transaction type, presenting a concise interface for known customers or a detailed one for new users, enhancing usability. The form generation module prepopulates fields with data retrieved from the distributed ledger, such as a customer's saved address or account history, reducing manual input and errors. This prepopulation leverages blockchain queries to access immutable records, ensuring data accuracy and streamlining the user experience.

Users interact with the dynamic form through an input module, entering data via text, dropdowns, or voice dictation, with real-time validation ensuring correctness. The generative artificial intelligence validates user input against prepopulated data, flagging discrepancies for correction, such as a mismatched loan amount. This validation step, supported by rule-based logic or machine learning, enhances data integrity before further processing. The populated form represents a structured dataset ready for secure transaction execution, bridging user interaction with network operations.

A tokenization module mints a non-fungible token to encapsulate the populated form, embedding attributes and a validity period based on the transaction type. This non-fungible token, implemented using standards like ERC-721, serves as a unique digital certificate, ensuring data ownership and authenticity. The validity period, such as 30 days for a loan application, is set via smart contract logic, accommodating regulatory or operational requirements. The non-fungible token's immutability, recorded on the distributed ledger, provides a verifiable record that can be audited by network participants.

The processing module coordinates the execution of the non-fungible token across distributed nodes, which verify attributes using the hash-based security token. Each node compares token hashes against the security token's distributed hash table, ensuring data integrity before finalizing actions like loan disbursement or compliance updates. This verification step, implemented with cryptographic libraries, maintains trust in a decentralized environment. The processing module aggregates node results, such as approval statuses, and forwards them to the ledger module for recording. The ledger module submits transaction results to the distributed ledger, creating an immutable record of outcomes, such as "loan_approved: true." This step, supported by blockchain clients like Web3.js, ensures transparency and auditability, helpful for regulatory compliance and dispute resolution. The distributed ledger, implemented as an Ethereum network or a private blockchain like Hyperledger Fabric, stores transactions, smart contracts, and non-fungible tokens, serving as the system's single source of truth. This decentralized storage eliminates reliance on centralized intermediaries, enhancing resilience and trust.

A validation module monitors the non-fungible token's validity period, comparing current timestamps against expiration dates. If the period is exceeded, the module transitions the token to a passive state via a smart contract update, preventing its use in further processing. This monitoring, implemented with cron jobs or event-driven services, ensures that only current data is utilized, accommodating dynamic financial environments where information like addresses may change. The validation module notifies nodes of the passive state, using API calls or blockchain events, maintaining network synchronization.

The system's use of distributed ledger technology ensures that all interactions, from prompt capture to transaction recording, are transparent and tamper-proof. The ledger's consensus mechanisms, such as Proof of Stake or Raft, validate transactions across nodes, ensuring agreement on data states. This transparency fosters trust among participants, including financial institutions, regulatory bodies, and government agencies, enabling collaborative transaction processing. The decentralized architecture also supports scalability, handling high transaction volumes without performance degradation.

The invention's flexibility allows it to support diverse use cases, from individual loan applications to inter-institutional compliance updates. By accommodating both individual and entity-level users, the system enables complex workflows, such as consortiums requesting multi-party data verification. This versatility, driven by generative artificial intelligence and smart contracts, positions the system as a transformative tool for decentralized finance, addressing varied financial needs with a single framework.

The integration of generative artificial intelligence, hash-based security, smart contracts, and non-fungible tokens creates a robust ecosystem for managing financial transactions. The generative artificial intelligence's dynamic form generation and validation enhance user experience, while hash-based security ensures data protection. Smart contracts provide a programmable framework for transaction logic, and non-fungible tokens guarantee data integrity and ownership, collectively addressing the challenges of decentralized finance, such as data variability and interoperability.

The system's architecture supports both small-scale and large-scale applications, from single-institution environments to global, multi-entity networks. Its modular design allows components to be updated or replaced without disrupting the overall system, ensuring adaptability to evolving technological and regulatory landscapes. This scalability and modularity, combined with the system's security and transparency, make it a comprehensive solution for modern financial ecosystems, facilitating seamless and trustworthy transaction processing.

Various example embodiments in the disclosure are designed to fulfill the objectives mentioned in the overview, enabling secure, efficient, and transparent generation and processing of electronic content in a decentralized finance network, as showcased in the accompanying illustrations. These figures, including system architecture, flow, sequence, and class diagrams, illustrate systems and methods for implementing the invention, demonstrating how components interact to achieve dynamic transaction processing, though different implementation approaches are possible, with adjustments to structure and operation allowed, and connections among components should be understood flexibly as direct or indirect, wired or wireless, unless specified otherwise, ensuring adaptability to diverse technical environments.

One type of artificial intelligence applicable to the invention is natural language processing, which involves algorithms that enable computers to understand and generate human language, critical for analyzing customer prompts to extract attributes and determine transaction types. In this system, natural language processing is used by the generative artificial intelligence module to interpret voice or text inputs, such as "Apply for a business loan," classifying intents and mapping them to attributes like loan amount or credit score. Techniques like transformer-based models, such as BERT or GPT-4, can be employed, trained on financial datasets to handle domain-specific terminology. Tools like Hugging Face's Transformers library or Google's Cloud Natural Language API could implement this, ensuring accurate prompt analysis and robust intent recognition across diverse user inputs.

Another type of artificial intelligence is rule-based systems, which use predefined logic to make decisions based on specific conditions, applicable to validating user inputs and enforcing smart contract rules. In the invention, rule-based systems are used to compare user-entered form data against prepopulated ledger data, flagging discrepancies, and to execute smart contract workflows, such as requiring a minimum credit score for loan approval. These systems can be implemented with tools like Drools, a business rules management system, or custom logic in Solidity for smart contracts, allowing precise control over transaction processes. By codifying financial regulations and transaction requirements, rule-based systems ensure compliance and consistency in decentralized operations.

Machine learning, a type of artificial intelligence where models learn from data to make predictions or decisions, is also applicable, particularly for optimizing form generation and attribute extraction. The generative artificial intelligence module could use machine learning to refine form layouts based on user interaction patterns, creating concise forms for frequent users, or to improve attribute extraction by learning from historical prompts. Supervised learning models, trained on labeled financial transaction data, or reinforcement learning, optimizing form usability, could be implemented using frameworks like TensorFlow or PyTorch. These models enhance the system's adaptability, ensuring it evolves with user needs and transaction trends.

In FIG. 1, the system architecture is anchored by the User Device (100), which serves as the primary interface for customer interactions within the decentralized finance network. This component can be implemented as a smartphone equipped with a native financial application supporting voice, text, and gesture inputs, a tablet running a progressive web application with a responsive interface, a desktop computer accessing a browser-based portal, or a spatial computing device like an augmented reality headset enabling three-dimensional gesture-based interactions. For example, a customer might use a smartphone app to submit a loan application prompt by typing income details or speaking a request to open a new account, or they could use a headset to navigate a virtual form with hand gestures. The User Device (100) is designed to handle diverse input modalities, ensuring accessibility for users with varying preferences or technological capabilities. It establishes connections to the Generative AI Module (102), which processes customer prompts to extract relevant attributes and determine the transaction type, and to the Input Module (114), which collects user input for populating dynamically generated electronic forms.

The Generative AI Module (102) is a component that leverages advanced artificial intelligence to interpret and analyze customer prompts. It can be implemented as a cloud-based server cluster running a transformer-based large language model, such as a fine-tuned BERT or GPT variant, trained on financial transaction datasets to classify intents (e.g., requesting a loan versus updating compliance data) and map them to required attributes (e.g., income, collateral details, or business ownership information). For instance, if a customer submits a prompt like "Apply for a business loan," the module might extract attributes like annual revenue, business registration number, and loan amount, while identifying the transaction as a "loan_application." Alternatively, it could be deployed on an edge computing device for low-latency processing in high-traffic environments, such as a bank's local server handling real-time customer requests. The Generative AI Module (102) connects to the Webhook Module (104) to relay extracted attributes and transaction metadata, and to the Form Generation Module (112) to support dynamic form creation.

The Webhook Module (104) facilitates real-time communication with distributed nodes by transmitting data payloads. This component can be implemented as a lightweight API gateway hosted on a scalable cloud platform like AWS API Gateway, configured to send JSON-formatted payloads containing attributes, transaction types, and intent metadata to network participants. For example, a payload for a loan application might include fields like "loan_amount: $50, 000" and "transaction_type: loan_application." It could also be a custom-built microservice running on Kubernetes, optimized for high-throughput webhook calls in a decentralized network. The Webhook Module (104) establishes connections to Distributed Node 1 (124), Distributed Node 2 (126), and Distributed Node 3 (128), each representing a distinct platform within the decentralized finance ecosystem. These connections ensure that relevant nodes receive the necessary data to contribute to the transaction process.

Distributed Node 1 (124), Distributed Node 2 (126), and Distributed Node 3 (128) are independent entities in the network, each associated with a specific platform. Distributed Node 1 (124) could be a lending platform server, such as a decentralized application running on a blockchain like Polygon, managing loan approvals by verifying creditworthiness attributes. Distributed Node 2 (126) might be a regulatory compliance server, implemented as a private cloud instance operated by a financial oversight body, tasked with validating anti-money laundering data like customer identity documents. Distributed Node 3 (128) could be a government agency server, such as a tax authority's system, processing attributes related to tax obligations or business registrations. Each node runs blockchain client software, such as Hyperledger Besu or Ethereum's Geth, enabling them to interact with the distributed ledger and respond to webhook payloads with data like approval statuses or additional attribute requirements. These nodes connect back to the Content Assembly Module (110), providing responses that inform the creation of electronic content.

The Security Module (106) is responsible for generating hash-based security tokens to protect data attributes at a granular level. It can be implemented as a cryptographic service on a secure server, utilizing algorithms like SHA-256 or Keccak-256 to compute unique hash addresses for attributes, such as hashing a customer's social security number or transaction amount to create a secure identifier.

For example, the attribute "customer_name: John Doe" might be hashed to a 64-character address stored in a distributed hash table. Alternatively, it could leverage a hardware security module for enhanced protection, ensuring cryptographic operations are performed in a tamper-resistant environment. The Security Module (106) connects to the Distribution Module (108), which disseminates the security tokens across the network.

The Distribution Module (108) ensures that security tokens are shared with relevant nodes. This component might be a blockchain node management service, such as a custom-built application using IPFS for decentralized data distribution, assigning hash ranges to nodes based on their roles. For instance, financial attributes like loan amounts could be assigned to Distributed Node 1 (124), while identity attributes like passport numbers are sent to Distributed Node 2 (126). It could also be integrated into a blockchain's consensus mechanism, ensuring tokens are distributed only to nodes with validated permissions. The Distribution Module (108) connects to Distributed Node 1 (124), Distributed Node 2 (126), and Distributed Node 3 (128), enabling attribute-level security across the network by ensuring each node receives the appropriate token segments.

The Content Assembly Module (110) aggregates responses from distributed nodes to create a structured JSON object. It can be implemented as a server-side application running on a cloud platform like Google Cloud Functions, parsing node responses and applying rules from the Smart Contract (130). For example, if Distributed Node 1 (124) provides a loan approval condition requiring a minimum credit score, the module incorporates this into the JSON object as "credit_score_requirement: 700." Alternatively, it could be a distributed application (DApp) executing on a blockchain, ensuring tamper-proof assembly of content. The Content Assembly Module (110) connects to the Smart Contract (130) to access transaction rules and to the Form Generation Module (112) to provide the JSON object for form creation.

The Smart Contract (130), hosted on the Distributed Ledger (132), defines the rules, conditions, and workflows for transactions. It might be implemented as an Ethereum smart contract written in Solidity, specifying sequences like "validate income attribute, then check collateral status, then issue loan approval." For a compliance update, it could require attributes like "business_registration_number" and "updated_address" before recording the transaction. Alternatively, it could be a Hyperledger Fabric chaincode, optimized for private networks with stricter access controls. The Distributed Ledger (132) underpins the entire system, implemented as an Ethereum blockchain network, a private Corda network, or a hybrid blockchain like Quorum, storing smart contracts, transaction records, and non-fungible tokens to ensure transparency, immutability, and auditability.

The Form Generation Module (112) creates dynamic electronic forms based on the JSON object. This component could be a front-end service integrated into the financial application, using a framework like React to render forms with fields for attributes such as "loan_amount" or "business_ownership_details." It leverages generative AI to tailor forms, for instance, generating a concise form with five fields for an existing customer's account opening versus a detailed form with ten fields for a new customer. The module might also prepopulate fields with network data, like a customer's saved address, retrieved from the Distributed Ledger (132). It connects to the Input Module (114), which collects user input, implemented as a user interface component supporting text fields, dropdowns, or voice input processing, ensuring seamless data entry.

The Input Module (114) feeds user input to the Tokenization Module (116), which mints non-fungible tokens to secure the populated form. The Tokenization Module (116) can be a blockchain service using the ERC-721 standard to generate tokens, embedding attributes and a validity period, such as a 30-day validity for a loan application or a one-year validity for compliance data. For example, a token for a loan application might include attributes like "loan_amount: $50, 000" and "validity: 2025-06-30." Alternatively, it could use ERC-1155 for batch minting in high-volume scenarios. The Tokenization Module (116) connects to the Processing Module (118), which orchestrates transaction execution.

The Processing Module (118) coordinates the processing of non-fungible tokens across Distributed Node 1 (124), Distributed Node 2 (126), and Distributed Node 3 (128). It might be a distributed application running on a blockchain, verifying token attributes against the hash-based security token and recording results via the Ledger Module (122). For instance, it could confirm that a loan application token's attributes match the security token's hash addresses before finalizing the transaction. It also connects to the Ledger Module (122), implemented as a blockchain client like Web3.js, which submits transaction data to the Distributed Ledger (132), ensuring an immutable record of outcomes, such as "loan_approved: true" or "compliance_updated: 2025-05-28."

The Validation Module (120) monitors the validity of non-fungible tokens, connecting to the Tokenization Module (116) and the distributed nodes. It can be a time-based monitoring service deployed on a server, using a cron job to compare current timestamps against token validity periods, transitioning expired tokens to a passive state and notifying nodes via API calls. For example, a token with a validity period ending on Jun. 30, 2025, would be marked passive on Jul. 1, 2025, with notifications sent to Distributed Node 1 (124) to halt processing. The Validation Module (120) ensures that only active tokens are used, maintaining data relevance.

The distributed nodes, Distributed Node 1 (124), Distributed Node 2 (126), and Distributed Node 3 (128), also connect back to the Content Assembly Module (110), completing the data flow loop. This feedback mechanism allows nodes to provide updated attributes or confirmations, such as a regulatory node confirming identity verification or a lending node updating loan terms. The iterative nature of these connections enables continuous refinement of electronic content, supporting complex, multi-party transactions in the decentralized finance network with robust security and transparency.

Figure 2:
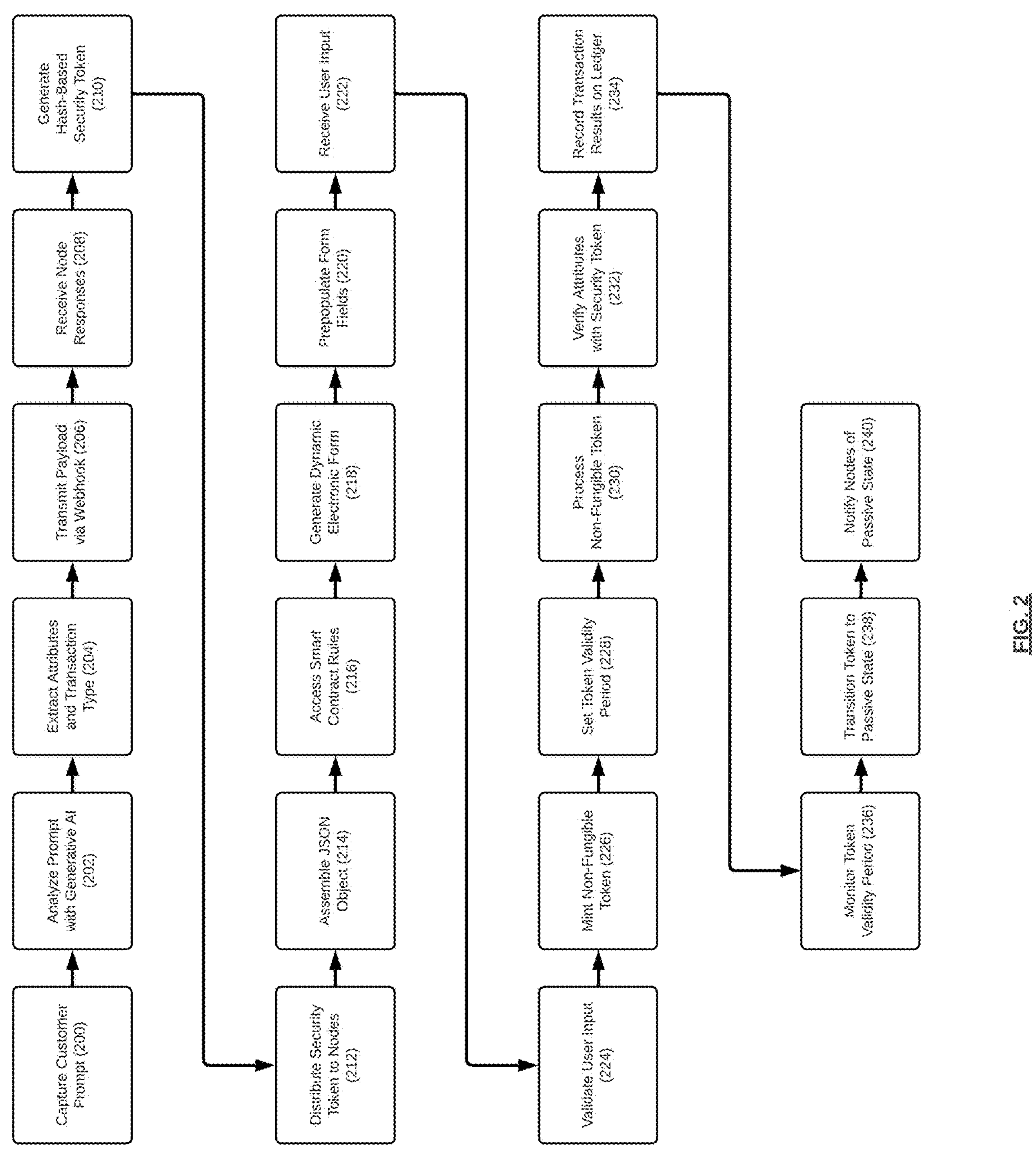
FIG. 2 is an exemplary flow diagram in accordance with one or more embodiments disclosed herein that illustrates the sequential process for generating and processing electronic content in a decentralized finance network. The diagram details the steps from capturing a customer prompt to executing a financial transaction, ensuring security and transparency through distributed ledger technology.
Figure 3A:
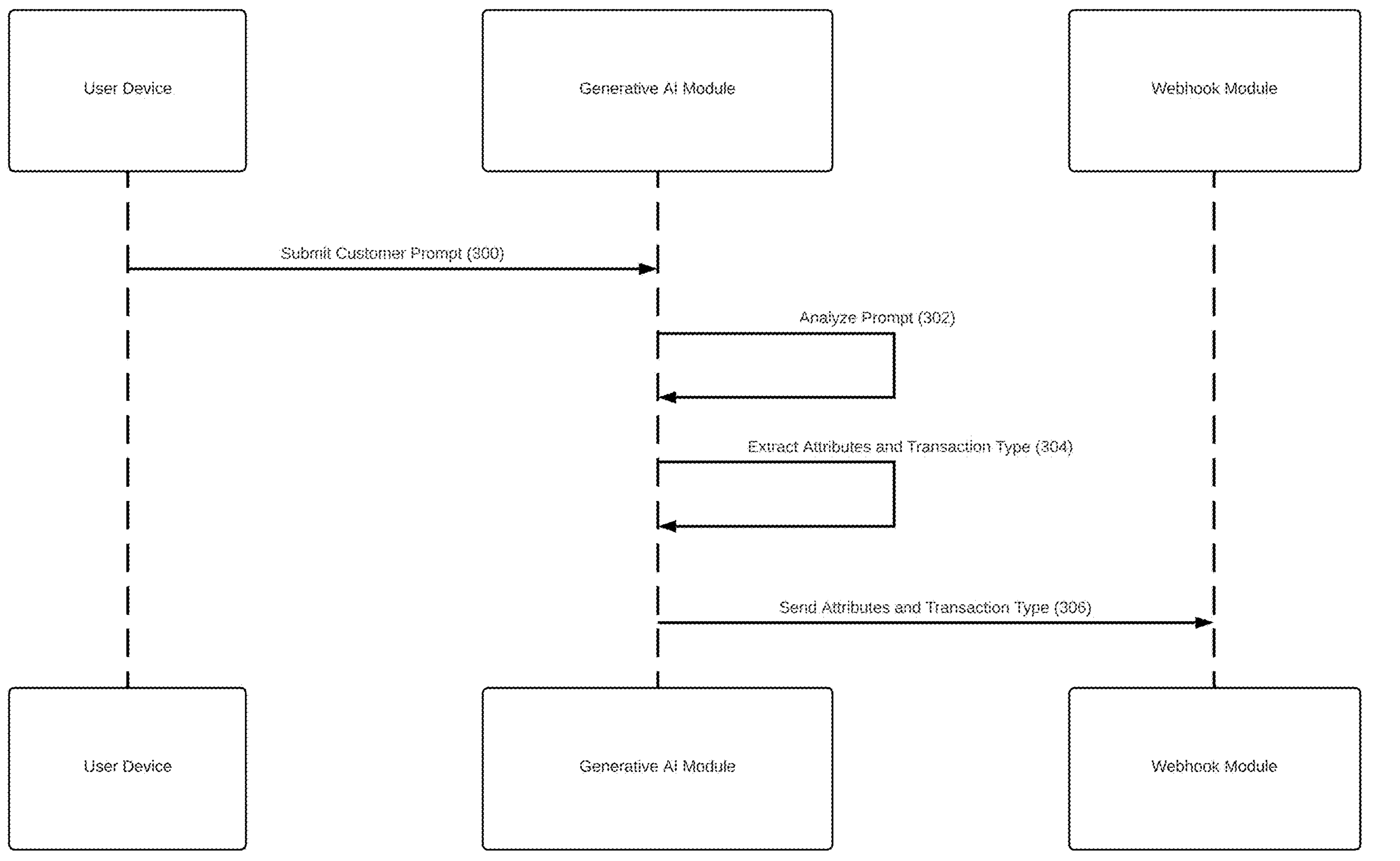
FIGS. 3A-3D collectively constitute an exemplary sequence diagram in accordance with one or more embodiments disclosed herein that illustrates the comprehensive interaction flow among components in a decentralized finance network for generating and processing electronic content. The diagrams detail the sequential data exchanges from capturing a customer prompt to executing a financial transaction, ensuring secure and transparent processing through distributed ledger technology.
Figure 3B:
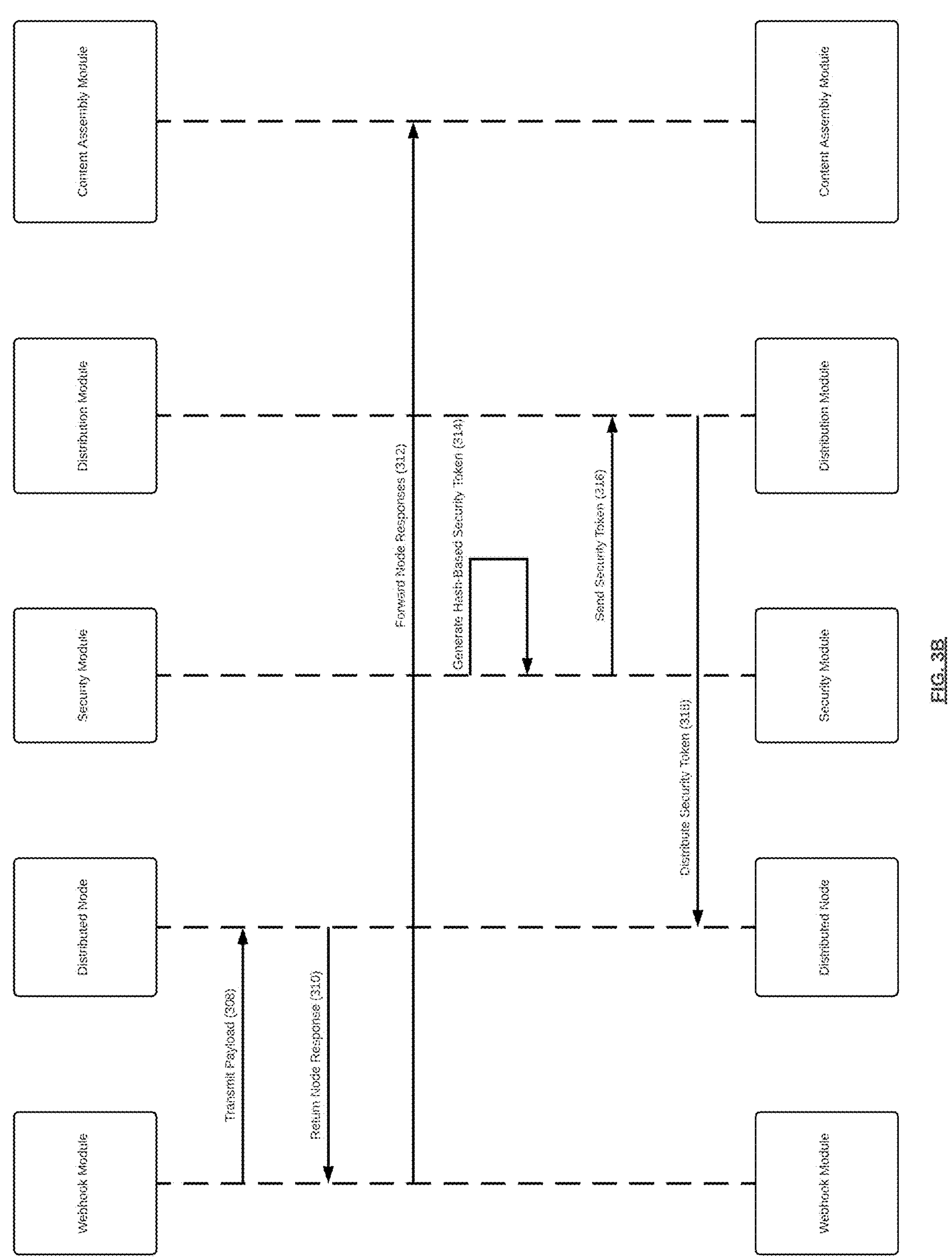
Figure 3C:
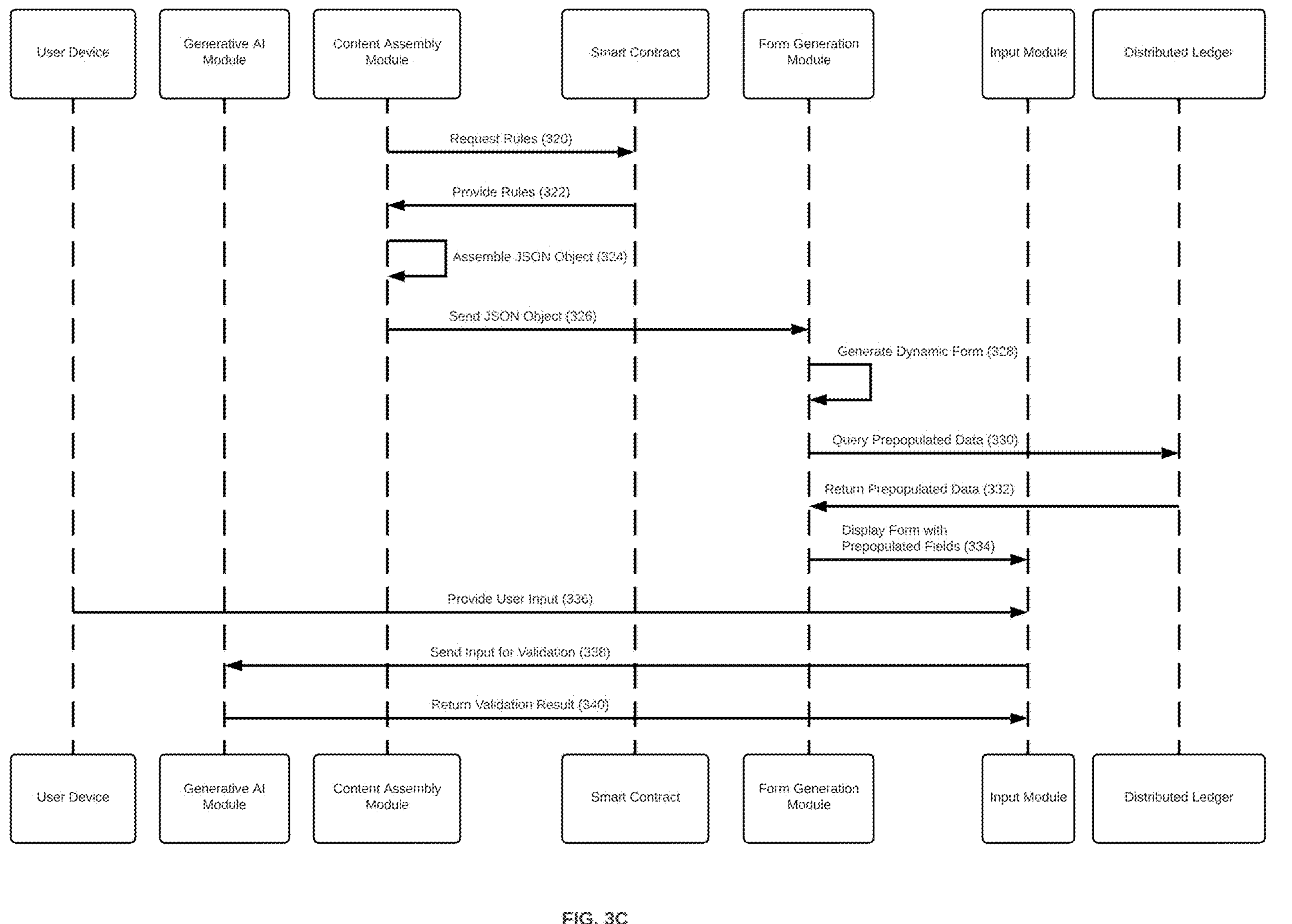
Figure 3D:
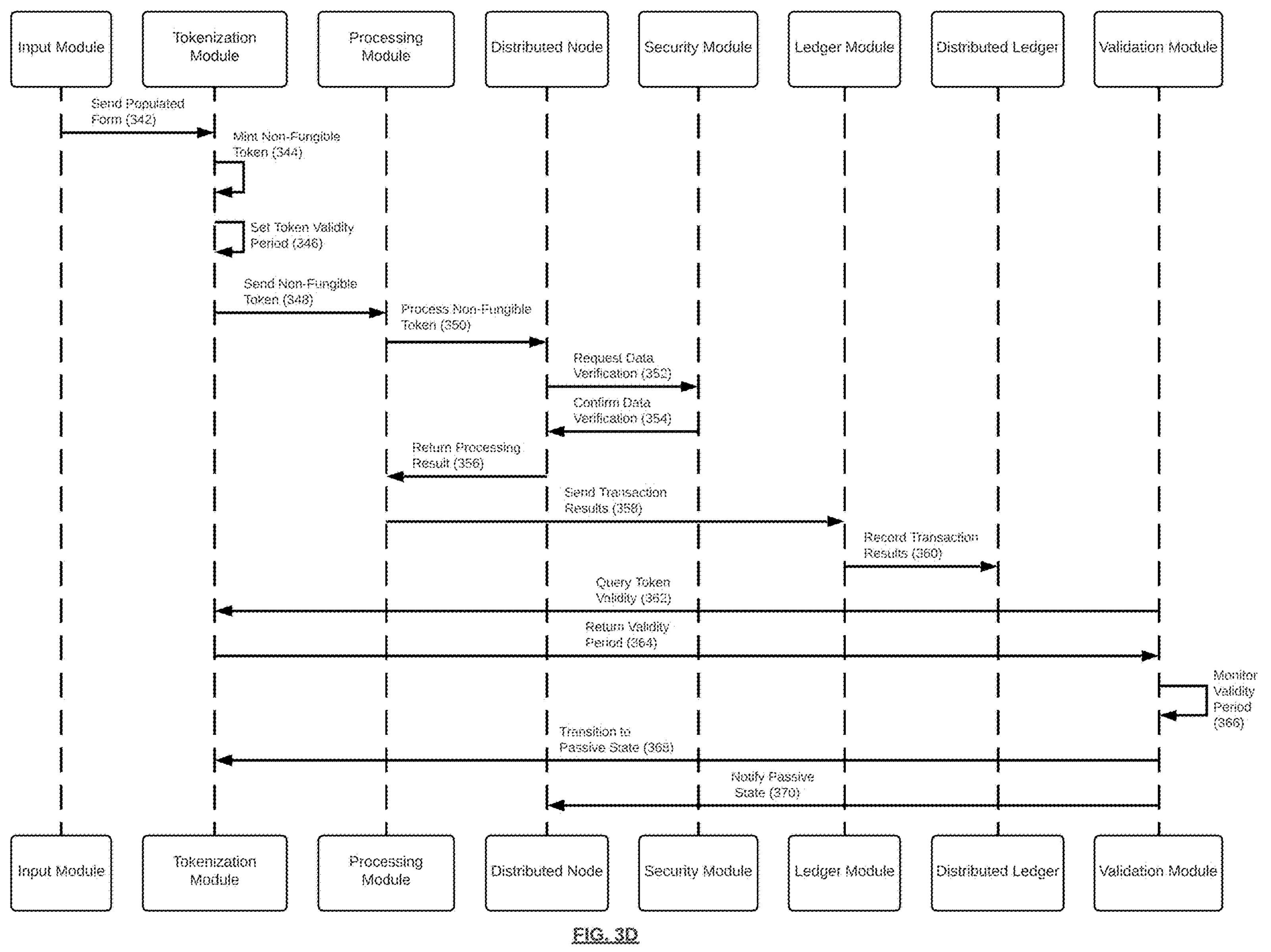

In FIG. 2, the example process begins with capturing a customer prompt through a user device, initiating the workflow for generating and processing electronic content in a decentralized finance network (200). This step can be implemented using a financial application on a smartphone, tablet, or spatial computing device, where users input prompts via voice, text, or gestures. For example, a customer might speak "Apply for a $50,000 business loan" into a mobile app's voice interface or type a request to update compliance data on a web portal. The application could use speech-to-text libraries like Google Speech-to-Text for voice inputs or a React-based form for text entries, ensuring compatibility with diverse input modalities. The captured prompt is then analyzed by a generative artificial intelligence module to interpret its intent and context (202). This analysis might involve a cloud-hosted large language model, such as a fine-tuned GPT-4, running on AWS, trained on financial transaction datasets to classify intents like "loan application" or "account opening." The model could process the prompt "Apply for a business loan" to identify the intent as a loan request, using natural language processing techniques to parse semantic structures and contextual cues.

Following analysis, the generative artificial intelligence module extracts a set of attributes and determines the transaction type associated with the prompt (204). This step can be implemented by mapping the classified intent to a predefined attribute schema stored in a database, such as MongoDB, where a loan application might require attributes like "loan_amount," "business_revenue," and "credit_score." For instance, the prompt "Apply for a $50,000 business loan" could yield attributes like "loan_amount: $50,000" and "transaction_type: business_loan." The module might use rule-based logic or machine learning to ensure all necessary attributes are identified, cross-referencing with regulatory requirements for compliance. The extracted attributes and transaction type are then packaged into a JSON payload and transmitted via a webhook to a plurality of distributed nodes in the network (206). This transmission could be handled by an API gateway, such as Kong, configured to send HTTP POST requests to node endpoints. The payload might include metadata like "intent: loan_application" and "timestamp: 2025-05-28T10:36:00," ensuring nodes receive comprehensive context. The webhook could be secured with OAuth 2.0 to authenticate node access, supporting platforms like lending, compliance, or governmental services.

The distributed nodes, such as a lending platform on Polygon or a regulatory server on a private cloud, process the payload and return responses containing additional data or confirmations (208). This step can be implemented using node-specific microservices, each running a blockchain client like Hyperledger Besu, which validates the payload against node-specific criteria. For example, a lending node might respond with "credit_score_requirement: 700," while a compliance node confirms "identity_verified: true." Responses are aggregated via a message queue like RabbitMQ, ensuring reliable communication in a decentralized environment. Concurrently, a security module generates a hash-based security token to protect the attributes (210). This can be implemented as a cryptographic service on a secure server, using SHA-256 to compute hash addresses for attributes, such as hashing "loan_amount: $50,000" to a unique 64-character identifier. The token, structured as a distributed hash table, could be stored in a Redis cache for quick access, with ranges assigned based on attribute types, like financial data versus identity data.

The security token is distributed across the distributed nodes to enable attribute-level security (212). This step might use a blockchain node management service, such as an IPFS-based distribution protocol, to send token segments to nodes based on their roles. For instance, the lending node receives financial attribute hashes, while the compliance node gets identity hashes, with distribution recorded on the blockchain for auditability. The system could employ a consensus mechanism like Raft to ensure reliable delivery. Next, a content assembly module assembles a JSON object containing the attributes, based on node responses and smart contract rules (214). This can be implemented as a server-side application on Google Cloud Functions, parsing responses to create a structured object, such as {"loan_amount": "$50,000", "credit_score": "750"}. The module queries the smart contract to access rules defining required attributes, ensuring compliance with transaction logic.

The smart contract rules are accessed to guide the assembly process (216). This step involves interacting with a smart contract hosted on a distributed ledger, such as an Ethereum contract written in Solidity, which specifies workflows like "validate loan_amount, then check credit_score." The contract could be deployed on a private Ethereum network, accessed via Web3.js, with rules stored as key-value pairs for scalability. A dynamic electronic form is then generated on the user device, with fields corresponding to the JSON object's attributes (218). This can be implemented using a React Native component in the financial app, rendering a form with fields like "Loan Amount" and "Business Revenue," tailored to the transaction type. The generative AI could adjust field layouts based on user profiles, generating a concise form for known customers versus a detailed one for new users.

The form's fields are prepopulated with data retrieved from the network (220). This step might involve querying the distributed ledger via a GraphQL API to fetch stored attributes, such as a customer's saved address or account history, using a service like The Graph. For example, a field for "Customer Address" could be autofilled with "123 Main St., City, State," reducing user effort. User input is received to populate the form's fields (222), implemented through the app's input interface, supporting text entry, dropdown selections, or voice dictation. The interface could use real-time validation with JavaScript to ensure data accuracy, such as checking numeric formats for loan amounts. The input is validated against prepopulated data to confirm consistency (224). This can be handled by the generative AI module, comparing user-entered data against network records, flagging discrepancies like a mismatched address for manual review, using a rule engine like Drools.

A non-fungible token is minted to represent the populated form (226). This step can be implemented as a blockchain service using the ERC-721 standard, generating a token with attributes like "loan_amount: $50,000" and a unique identifier, executed on an Ethereum node. The token's validity period is set based on the transaction type (228), such as 30 days for a loan application, stored as a timestamp in the token's metadata. This could use a smart contract function to compute validity, ensuring alignment with regulatory requirements. The non-fungible token is processed by the distributed nodes to execute the transaction (230). This involves a distributed application verifying token attributes, implemented as a DApp on Polygon, coordinating with nodes to finalize actions like loan disbursement or compliance updates.

The token's attributes are verified using the hash-based security token (232). Each node compares token hashes against the security token's distributed hash table, ensuring data integrity. This can be implemented with a cryptographic library like OpenSSL, running on node servers. Transaction results are recorded on the distributed ledger (234), using a blockchain client like Web3.py to submit data, such as "loan_approved: true," to an Ethereum network. The token's validity period is monitored (236), with a monitoring service checking timestamps against the token's expiration date, implemented as a cron job on a server. If the validity period is exceeded, the token transitions to a passive state (238), updated via a smart contract function that flags the token as inactive. Finally, nodes are notified of the passive state (240), using API calls or blockchain events, ensuring no further processing occurs, implemented with a notification service like Firebase Cloud Messaging.

In FIGS. 3A-3D, the sequence diagram begins with the User Device submitting a customer prompt to the Generative AI Module, initiating the workflow for generating and processing electronic content in a decentralized finance network (300). This step can be implemented using a financial application on a smartphone, where a user types "Apply for a $50,000 loan" or speaks "Open a new account" into a voice interface. The app, built with React Native, could use Google Speech-to-Text for voice inputs or a text input field with real-time validation, sending the prompt to a cloud endpoint via HTTPS. The Generative AI Module then analyzes the prompt to interpret its intent and context (302). This involves a cloud-based large language model, such as a fine-tuned GPT-4 hosted on AWS, trained on financial datasets to classify intents like "loan_application" or "compliance_update." The model processes the prompt using natural language processing, leveraging attention mechanisms to identify key phrases, and logs the analysis for debugging. Next, the Generative AI Module extracts attributes and determines the transaction type (304). This can be implemented by querying a MongoDB database with a predefined schema, mapping the intent "loan_application" to attributes like "loan_amount: $50,000" and "credit_score." A rule-based engine ensures all required attributes align with regulatory standards, such as anti-money laundering requirements. The Generative AI Module sends the attributes and transaction type to the Webhook Module (306). This step uses an internal API call, formatted as a JSON payload {"transaction_type": "loan_application", "attributes": {"loan_amount": "$50,000"}}, secured with JWT authentication, to a microservice endpoint.

The Webhook Module transmits the payload to a Distributed Node, representing a platform like a lending service (308). This can be implemented using an API gateway like Kong, sending HTTP POST requests to the node's endpoint, secured with OAuth 2.0. The payload includes metadata like "intent: loan_application" and "timestamp: 2025-05-28T10:36:00," ensuring context for processing. The Distributed Node, running a blockchain client like Hyperledger Besu on a Polygon network, returns a response to the Webhook Module (310). This response, such as {"credit_score_requirement": "700"}, is generated by a node microservice validating the payload against platform rules, sent via a RESTful API and queued in RabbitMQ for reliability. The Webhook Module forwards the node responses to the Content Assembly Module (312). This step involves aggregating responses into a single dataset, implemented as a Node.js service on Google Cloud Functions, which buffers incoming data and logs interactions for traceability. Concurrently, the Security Module generates a hash-based security token (314). This is a cryptographic service on a secure server, using SHA-256 to hash attributes like "loan_amount" into unique addresses, stored in a distributed hash table. The token is cached in Redis for quick access, with ranges assigned by data type, such as financial versus identity attributes.

The Security Module sends the security token to the Distribution Module (316). This internal transfer uses a gRPC protocol for high-performance communication, with the token serialized as a Protobuf message. The Distribution Module distributes the security token to the Distributed Node (318). This can be implemented using an IPFS-based protocol, assigning hash ranges to nodes based on roles, like financial data to a lending node. The distribution is recorded on the blockchain via a smart contract call, ensuring auditability with a Raft consensus mechanism. The Content Assembly Module requests rules from the Smart Contract (320). This involves a Web3.js call to an Ethereum smart contract, written in Solidity, specifying workflows like "validate loan_amount, then check credit_score." The Smart Contract returns the rules to the Content Assembly Module (322). This response, formatted as a JSON object {"rules": {"loan_amount": "required", "credit_score": ">700"}}, is retrieved via an Ethereum node, cached locally to reduce latency. The Content Assembly Module assembles a JSON object from node responses and rules (324). This step, implemented on Google Cloud Functions, parses responses to create {"loan_amount": "$50,000", "credit_score": "750"}, validated against contract rules to ensure completeness.

The Content Assembly Module sends the JSON object to the Form Generation Module (326). This internal API call, secured with API keys, transfers the object to a front-end service. The Form Generation Module generates a dynamic form (328). This can be a React Native component rendering fields like "Loan Amount" and "Business Revenue," tailored using generative AI to adjust layouts for user profiles, such as fewer fields for known customers. The Form Generation Module queries the Distributed Ledger for prepopulated data (330). This involves a GraphQL query to an Ethereum network via The Graph, fetching attributes like "address: 123 Main St." The Distributed Ledger returns the prepopulated data (332), formatted as a JSON response, cached in memory for performance. The Form Generation Module displays the form with prepopulated fields to the Input Module (334). This step renders the form in the app's UI, using CSS for responsive design, with fields like "Address" autofilled.

The User Device provides user input to the Input Module (336). Users enter data via text fields or voice dictation, with the app's interface using JavaScript for real-time validation, ensuring formats like numeric loan amounts. The Input Module sends the input to the Generative AI Module for validation (338). This API call submits a JSON payload {"input": {"loan_amount": "$50,000"}}, processed by the AI to compare against prepopulated data. The Generative AI Module returns the validation result (340), such as {"status": "valid"}, implemented as a response to the Input Module's request, flagging errors for correction. The Input Module sends the populated form to the Tokenization Module (342). This step transfers the form data via a secure internal endpoint, serialized as JSON.

The Tokenization Module mints a non-fungible token (344). This is a blockchain service using ERC-721, generating a token with attributes like "loan_amount: $50,000," executed on an Ethereum node with gas optimization. The Tokenization Module sets the token's validity period (346), such as 30 days, via a smart contract function storing the timestamp "2025 Jun. 30." The Tokenization Module sends the non-fungible token to the Processing Module (348). This internal transfer uses a message queue like Kafka for reliability. The Processing Module processes the token across the Distributed Node (350). This DApp on Polygon coordinates with nodes, sending the token via a blockchain transaction, verified by node consensus.

The Distributed Node requests attribute verification from the Security Module (352). This API call submits token hashes, processed by OpenSSL to compare against the security token's hash table. The Security Module confirms verification (354), returning {"verified": true}, ensuring data integrity. The Distributed Node returns the processing result to the Processing Module (356), such as {"loan_approved": true}, via a RESTful API. The Processing Module sends transaction results to the Ledger Module (358). This step submits data to a blockchain client like Web3.py, formatted as a transaction log. The Ledger Module records results on the Distributed Ledger (360), writing to an Ethereum network with a unique transaction hash for auditability.

The Validation Module queries the Tokenization Module for token validity (362). This internal call retrieves the token's validity period, implemented as a smart contract read operation. The Tokenization Module returns the validity period (364), such as "valid_until: 2025-06-30," via a JSON response. The Validation Module monitors the validity period (366), using a cron job to check timestamps, running on a server with Node.js. If expired, the Validation Module transitions the token to a passive state (368), updating the smart contract to flag the token as inactive. Finally, the Validation Module notifies the Distributed Node of the passive state (370), sending API notifications or blockchain events via Firebase Cloud Messaging, ensuring nodes halt processing.

Figure 4A:
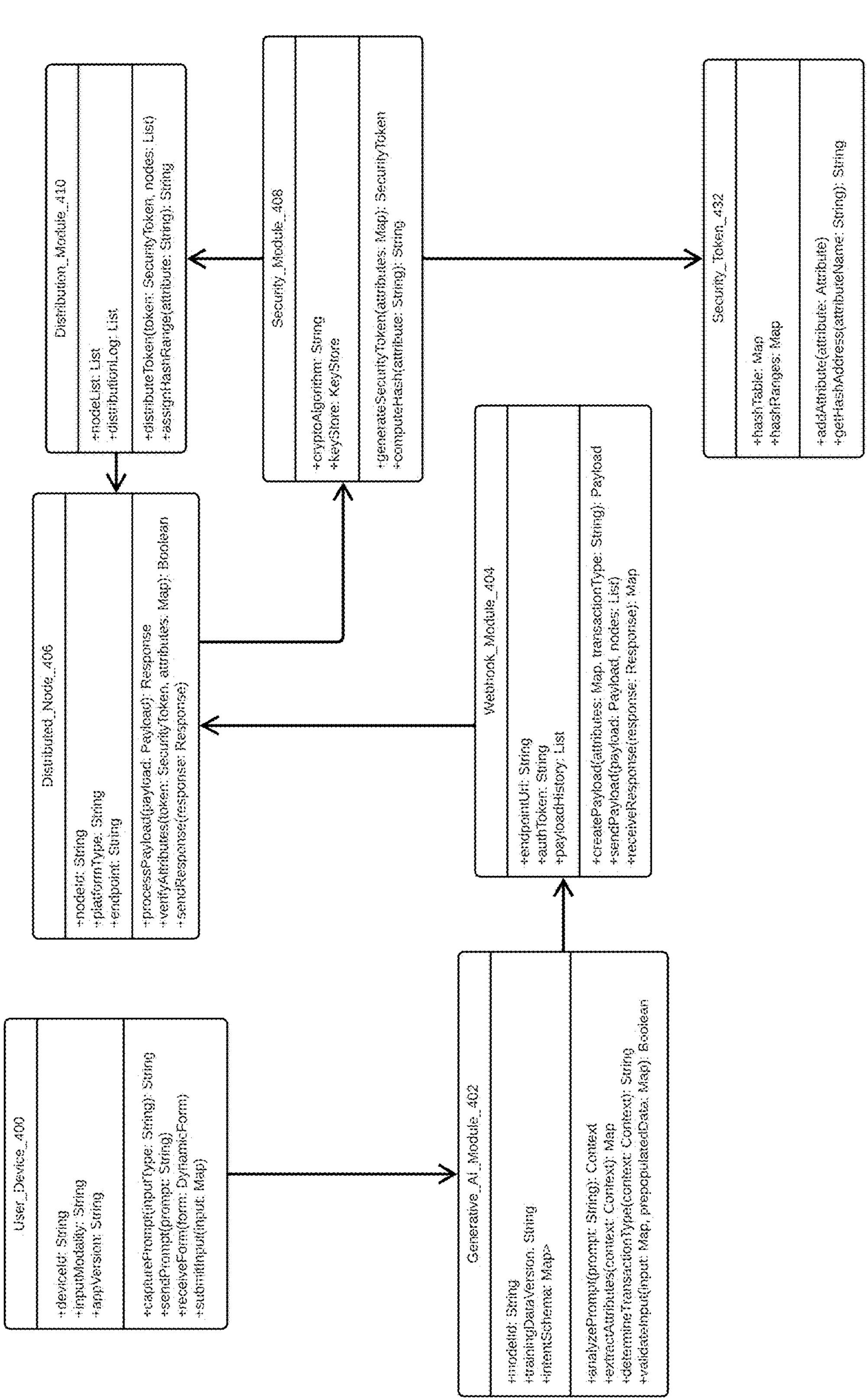
FIG. 4A-4B collectively constitute an exemplary class diagram in accordance with one or more embodiments disclosed herein that illustrates the object-oriented structure of a decentralized finance network for generating and processing electronic content. The diagrams detail the classes, their attributes, methods, and interconnections, capturing the relationships essential for secure and dynamic transaction processing.
Figure 4B:
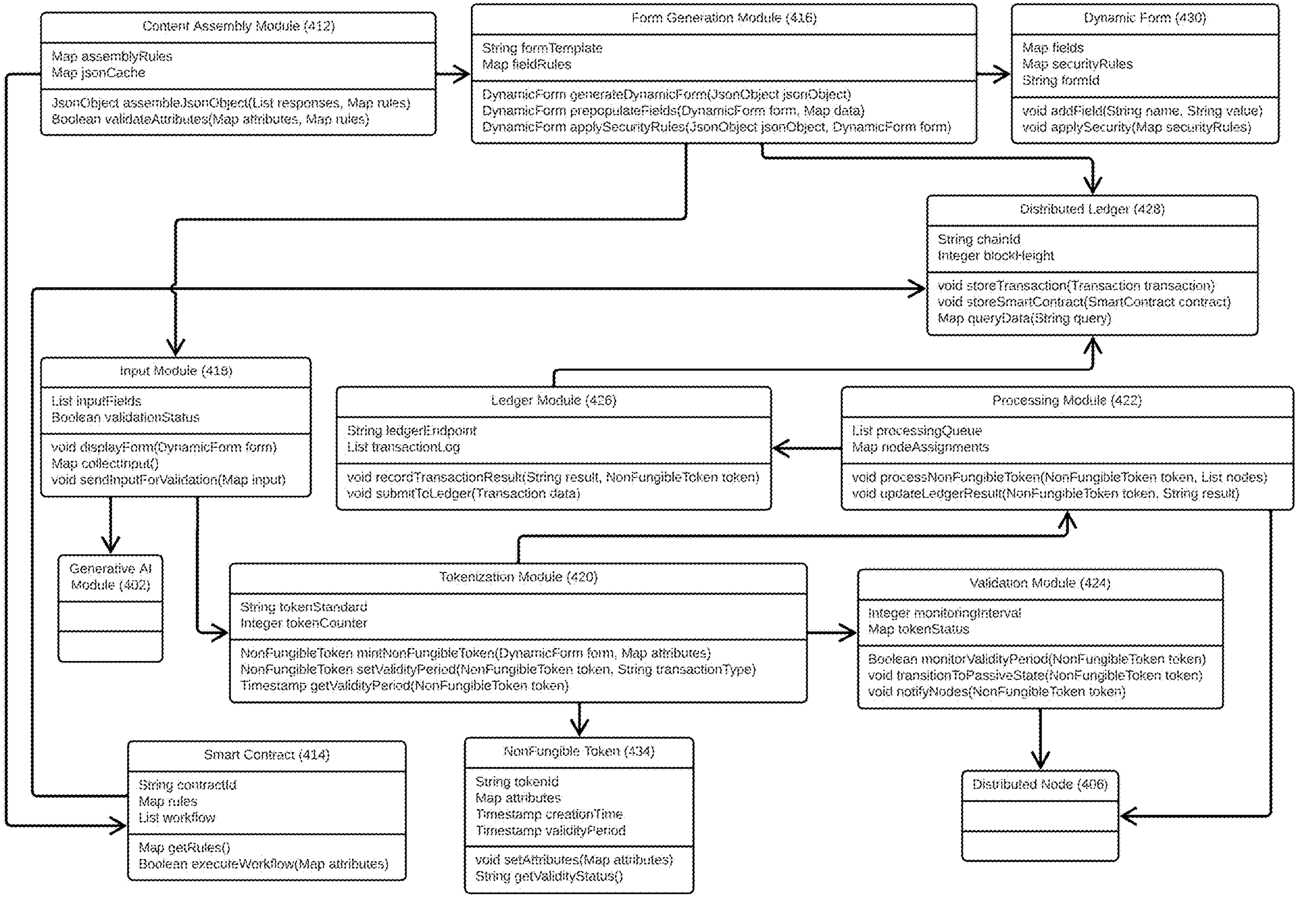

In FIGS. 4A-4B, the class diagram comprehensively represents the object-oriented design of a decentralized finance network, detailing the classes, their attributes, methods, and relationships that enable the generation and processing of electronic content with robust security and transparency. The diagram is split into two parts for clarity, with FIG. 4A focusing on classes related to user interaction, prompt processing, and initial data transmission, while FIG. 4B covers content assembly, form generation, tokenization, and ledger operations. In FIG. 4A, the User Device (400) class serves as the entry point for customer interactions, encapsulating attributes like deviceId, a unique identifier for the device (e.g., a smartphone's UUID), inputModality, specifying the input type (e.g., voice, text, or gesture), and appVersion, tracking the financial application's version (e.g., "2.3.1"). Its methods include capturePrompt, which collects user inputs like "Apply for a $50,000 loan" using libraries such as Google Speech-to-Text, sendPrompt to transmit the prompt to a server via HTTPS, receiveForm to display a dynamic form in the app's UI built with React Native, and submitInput to send user-entered data as a JSON object. This class associates with the Generative AI Module (402), reflecting the flow of prompts for analysis.

The Generative AI Module (402) class is central to processing customer prompts, with attributes modelId (e.g., "GPT-4-Finance"), trainingDataVersion (e.g., "2025.1"), and intentSchema, a map linking intents like "loan_application" to required attributes like "loan_amount." Its methods include analyzePrompt, which uses a transformer-based model to classify intents with attention mechanisms, extractAttributes to map intents to attributes via a MongoDB schema, determineTransactionType to identify transactions like "business_loan," and validateInput to compare user inputs against prepopulated data using a rule engine like Drools. This class associates with the Webhook Module (404), passing extracted data for network transmission, and later with the Input Module (418) in FIG. 4B for input validation, ensuring seamless data flow.

The Webhook Module (404) class manages payload transmission, with attributes endpointUrl (e.g., "https://node1.api"), authToken for OAuth 2.0 security, and payloadHistory to log sent payloads for auditing. Its methods createPayload to format attributes into JSON (e.g., {"loan_amount": "$50,000"}), sendPayload to dispatch payloads via HTTP POST using Kong API Gateway, and receiveResponse to parse node responses into a map. It associates with the Distributed Node (406) class, which represents network platforms like lending or compliance servers, with attributes nodeId (e.g., "Node_Lending_001"), platformType (e.g., "lending"), and endpoint for API communication. Its methods processPayload to validate data against platform rules, verifyAttributes to check token hashes, and sendResponse to return data like "credit_score_requirement: 700." The Distributed Node (406) also associates with the Security Module (408) for attribute verification.

The Security Module (408) class secures data with attributes cryptoAlgorithm (e.g., "SHA-256") and keyStore for managing cryptographic keys. Its methods generateSecurityToken to create a hash-based token with a distributed hash table and computeHash to produce unique addresses (e.g., a 64-character hash for "loan_amount"). It associates with the Distribution Module (410), which has attributes nodeList, tracking connected nodes, and distributionLog for auditing token distribution. Its methods distributeToken to send token segments via IPFS and assignHashRange to allocate hash ranges by data type. The Distribution Module (410) associates back with the Distributed Node (406), ensuring tokens reach appropriate platforms. The Security Module (408) also associates with the Security Token (432) class, which holds hashTable, mapping attributes to hashes, and hashRanges, defining address ranges. Its methods addAttribute to update the table and getHashAddress to retrieve hashes, completing the security framework in FIG. 4A.

In FIG. 4B, the Content Assembly Module (412) class aggregates node responses, with attributes assemblyRules (e.g., "loan_amount: required") and jsonCache for storing JSON objects. Its methods assembleJsonObject to create structured data (e.g., {"loan_amount": "$50,000"}) and validateAttributes to enforce contract rules. It associates with the Smart Contract (414) class, which has attributes contractId, rules (e.g., "credit_score>700"), and workflow, a list of operations like "validate, approve." Its methods getRules to retrieve rules via Web3.js and executeWorkflow to process attributes. The Smart Contract (414) associates with the Distributed Ledger (428), which stores transactions and contracts with attributes chainId (e.g., "Ethereum_Mainnet") and blockHeight for tracking blockchain state. Its methods storeTransaction, storeSmartContract, and queryData support ledger operations, implemented on an Ethereum network.

The Content Assembly Module (412) also associates with the Form Generation Module (416), which generates forms with attributes formTemplate (e.g., "loan_form_v1") and fieldRules for validation. Its methods generateDynamicForm to render forms using React, prepopulateFields to autofill data like "address: 123 Main St." from the ledger, and applySecurityRules to enforce token-based security. The Form Generation Module (416) associates with the Input Module (418), which has attributes inputFields (e.g., "loan_amount, credit_score") and validationStatus. Its methods displayForm to render the UI, collectInput to gather user data, and sendInputForValidation to request AI validation. The Input Module (418) associates with the Generative AI Module (402) from FIG. 4A for validation and with the Tokenization Module (420) for token minting.

The Tokenization Module (420) class mints tokens with attributes tokenStandard (e.g., "ERC-721") and tokenCounter for unique IDs. Its methods mintNonFungibleToken to create tokens, setValidityPeriod (e.g., 30 days for loans), and getValidityPeriod for monitoring. It associates with the Processing Module (422), which has attributes processingQueue for token management and nodeAssignments for node roles. Its methods processNonFungibleToken to coordinate transaction execution and updateLedgerResult to log outcomes. The Tokenization Module (420) also associates with the Validation Module (424), which monitors tokens with attributes monitoringInterval (e.g., 3600 seconds) and tokenStatus. Its methods monitorValidityPeriod, transitionToPassiveState, and notifyNodes ensure token lifecycle management. The Processing Module (422) associates with the Distributed Node (406) from FIG. 4A and the Ledger Module (426), which has attributes ledgerEndpoint and transactionLog. Its methods recordTransactionResult and submitToLedger interact with the Distributed Ledger (428).

The Form Generation Module (416) associates with the Dynamic Form (430) class, which has attributes fields, securityRules, and formId. Its methods addField to update form data and applySecurity to enforce rules. The Tokenization Module (420) associates with the NonFungible Token (434) class, with attributes tokenId, attributes, creationTime, and validityPeriod. Its methods setAttributes and getValidityStatus manage token data. The connections across FIG. 4A and FIG. 4B, including cross-figure associations like Input Module (418) to Generative AI Module (402), ensure a cohesive system design, supporting secure and efficient transaction processing in a decentralized finance network.

Figure 5:
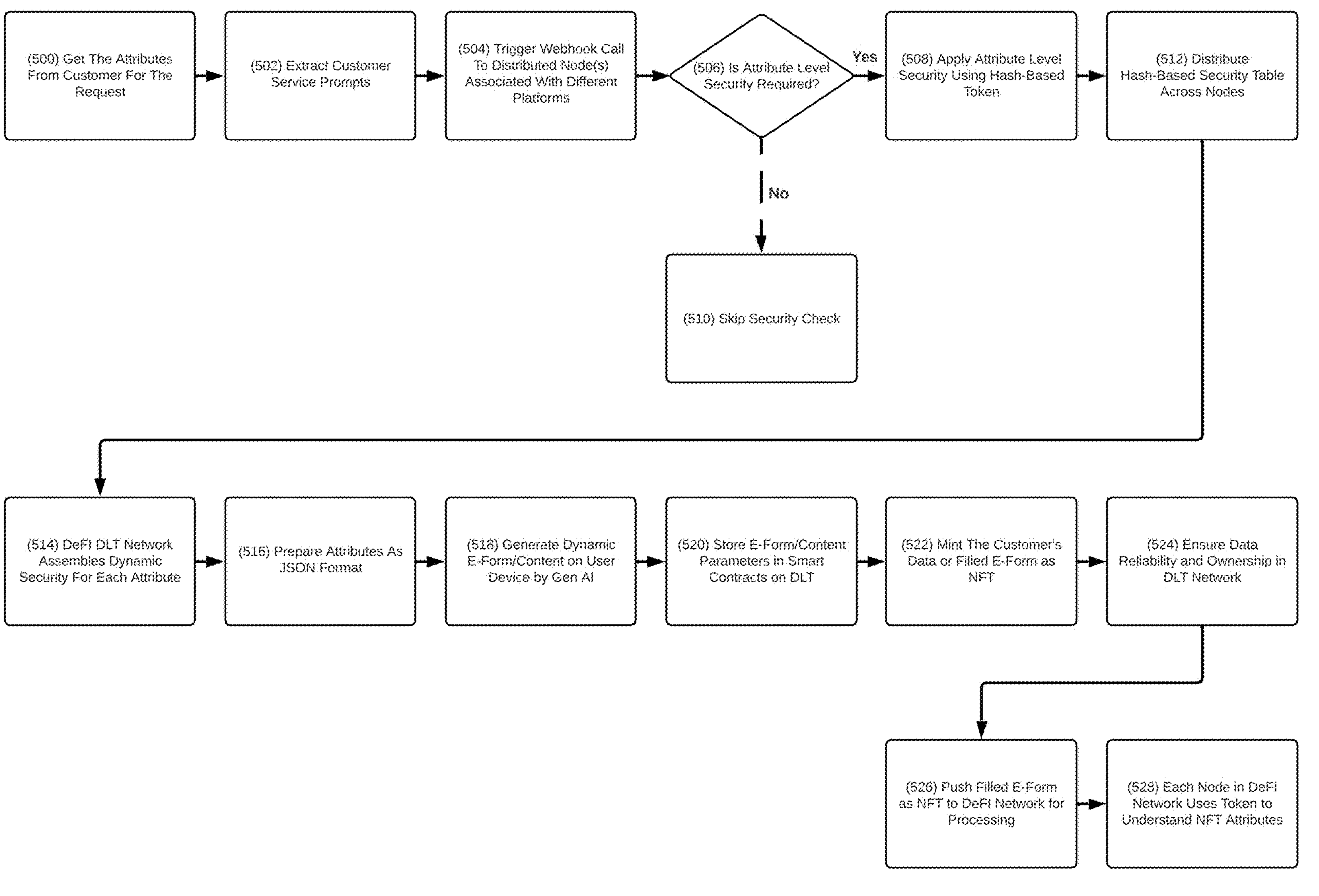
FIG. 5 is an exemplary solution flow diagram in accordance with one or more embodiments disclosed herein that illustrates the sequential process for generating and processing electronic content in a decentralized finance network with attribute-level security and non-fungible token integration. The diagram details the steps from capturing customer attributes to processing a secure, tokenized form across distributed nodes, ensuring data integrity and ownership.

In FIG. 5, a sample solution flow diagram outlines an example process for generating and processing electronic content in a decentralized finance network, illustrating the security, transparency, and efficiency of the inventions disclosed herein through distributed ledger technology and generative artificial intelligence. The process begins with capturing attributes from the customer based on their request, initiating the workflow (500). This step can be implemented using a financial application on a user device, such as a smartphone or tablet, where customers input data via voice, text, or gestures. For example, a customer requesting a loan might enter attributes like "loan_amount: $50, 000" or "business_revenue: $1 M" through a React-based form or speak the request into a voice interface using Google Speech-to-Text. The application validates inputs in real-time with JavaScript to ensure correct formats, such as numeric values for financial data, and stores them temporarily in a local SQLite database for processing.

The customer service prompt is then extracted to prepare for network interaction (502). This involves parsing the user's input to identify the intent and relevant attributes, implemented using a generative AI module hosted on a cloud server like AWS. A transformer-based model, such as BERT fine-tuned on financial datasets, analyzes the prompt "Apply for a business loan" to extract attributes and classify the intent as a loan application. The extracted data is structured as a JSON object, such as {"intent": "loan_application", "attributes": {"loan_amount": "$50,000"}}, and logged for traceability. A webhook call is triggered to distributed node(s) associated with different platforms, such as lending, compliance, or government services (504). This step uses an API gateway like Kong to send HTTP POST requests to node endpoints, secured with OAuth 2.0. The payload includes the attributes, intent, and metadata like "timestamp: 2025-05-28T10:36:00," routed to nodes running blockchain clients like Hyperledger Besu on a Polygon network.

The process then evaluates whether attribute-level security is required, serving as a decision point (506). This can be implemented with a rule-based logic engine, such as Drools, checking transaction type and regulatory requirements stored in a MongoDB database. For example, a loan application might require security due to sensitive financial data, while a simple account query might not. If no security is needed, the process skips to preparing attributes in JSON format, bypassing security checks (510). This skip can be a direct function call in the system's backend, implemented in Node.js, redirecting the flow to content assembly without additional processing, ensuring efficiency for low-risk transactions.

If attribute-level security is required, a hash-based token is applied to secure the attributes (508). This step involves a security module generating a token with a distributed hash table, using SHA-256 to compute unique hash addresses for attributes like "loan_amount" or "customer_id." The module, running on a secure server with OpenSSL, stores the token in a Redis cache for quick access, with hashes like "a1b2c3d4 . . . " for each attribute. The hash-based security table is distributed across nodes as a token (512). This distribution, managed by a distribution module, uses an IPFS-based protocol to send token segments to nodes based on their roles, such as financial data to a lending node. The distribution is recorded on the blockchain via a smart contract call, ensuring auditability with a Raft consensus mechanism, implemented in Go for performance.

The decentralized finance distributed ledger technology network assembles dynamic security for each attribute of the electronic form or content (514). This step involves nodes collaborating to apply security measures, guided by smart contract rules, implemented on an Ethereum network. For example, a lending node might enforce encryption for "loan_amount," while a compliance node secures "customer_id." The security configuration is prepared as a JSON object (516), using a content assembly module running on Google Cloud Functions. The JSON, such as {"attributes": {"loan_amount": {"value": "$50,000", "hash": "a1b2c3d4"}}}, is validated against contract rules to ensure completeness, cached for efficiency, and logged for auditing.

A dynamic electronic form or content is generated on the user device by generative AI (518). This step uses a form generation module, implemented with React Native, to render fields like "Loan Amount" or "Business Revenue," tailored to the transaction type. The generative AI, leveraging a model like GPT-4, adjusts form layouts based on user profiles, creating concise forms for known customers. The form incorporates attributes and security from the JSON object, with field validations derived from smart contract rules. The parameters, rules, conditions, logic, and workflow rules of the electronic form or content are stored in smart contracts on the distributed ledger (520). This involves deploying a Solidity contract on Ethereum, defining workflows like "validate loan_amount, then check credit_score," accessed via Web3.js. The contract stores rules as key-value pairs, ensuring scalability and immutability.

The customer's data or filled electronic form is minted as a non-fungible token to ensure data reliability and ownership (522). A tokenization module, using the ERC-721 standard, generates a token embedding attributes like "loan_amount: $50,000" and a validity period, executed on an Ethereum node with gas optimization. The token's unique identifier and metadata are stored on the blockchain, guaranteeing authenticity. Data reliability and ownership are ensured in the distributed ledger network (524). This step leverages the blockchain's immutability, with the non-fungible token recorded on Ethereum, accessible for audits via a GraphQL API like The Graph, ensuring trust across network participants.

The filled electronic form, now a non-fungible token, is pushed to the decentralized finance network for processing (526). A processing module, implemented as a distributed application on Polygon, coordinates with nodes to execute the transaction, sending the token via a blockchain transaction. Each node in the decentralized finance network uses the hash-based security token to understand the non-fungible token's attributes (528). Nodes compare token hashes against the security token's distributed hash table, implemented with OpenSSL, to verify data integrity. For example, a lending node confirms "loan_amount" matches its hash before approving the loan, ensuring secure and accurate processing across platforms like lending, compliance, or government services.

Pseudocode exemplars for implementing various aspects of this disclosure with respect to a for decentralized finance content generation and processing system are set forth below with explanations for reference.

```
// Global Structures and Variables
STRUCT Attribute
   STRING name
   STRING value
   STRING hashAddress
STRUCT SecurityToken
   MAP<STRING, Attribute> attributeTable
   MAP<STRING, STRING> hashRange
STRUCT SmartContract
   STRING contractId
   MAP<STRING, STRING> parameters
   MAP<STRING, STRING> rules
   MAP<STRING, STRING> conditions
   LIST<STRING> workflow
STRUCT NFT
   STRING tokenId
   MAP<STRING, Attribute> attributes
   TIMESTAMP creationTime
   TIMESTAMP validityPeriod
STRUCT Node
   STRING nodeId
```

-continued

```
   STRING platformType
   LIST<SmartContract> contracts
GLOBAL LIST<Node> networkNodes
GLOBAL MAP<STRING, SecurityToken> securityTokens
GLOBAL LIST<NFT> mintedNFTs
GLOBAL MAP<STRING, SmartContract> smartContracts
```

```
// Initialize Distributed Ledger
FUNCTION InitializeDistributedLedger( )
   networkNodes = EMPTY LIST
   securityTokens = EMPTY MAP
   mintedNFTs = EMPTY_LIST
   smartContracts = EMPTY_MAP
   FOR EACH node IN predefinedNodeList
      newNode = CREATE_NODE(node.id, node.platformType)
      ADD newNode TO networkNodes
   END FOR
   RETURN SUCCESS
```

```
// Capture Customer Prompt
FUNCTION CaptureCustomerPrompt(device, inputType)
   IF inputType == "voice"
      rawPrompt = CONVERT_VOICE_TO_TEXT(device.
microphoneInput)
   ELSE IF inputType == "text"
      rawPrompt = READ_TEXT_INPUT(device.textInput)
   ELSE
      rawPrompt = READ_OTHER_INPUT(device.otherInput)
   END IF
   promptContext = ANALYZE_PROMPT_WITH_GEN_
AI(rawPrompt)
   attributes = EXTRACT_ATTRIBUTES(promptContext)
   RETURN attributes
```

```
// Analyze Prompt with Generative AI
FUNCTION AnalyzePromptWithGenAI(prompt)
   context = INITIALIZE_GEN_AI_MODEL( )
   context.intent = CLASSIFY_INTENT(prompt)
   context.transactionType = DETERMINE_TRANSACTION_TYPE
(prompt)
   context.requiredAttributes = MAP_INTENT_TO_ATTRIBUTES
(context.intent)
   RETURN context
```

```
// Trigger Webhook to Distributed Nodes
FUNCTION TriggerWebhook(attributes, context)
   payload = CREATE_JSON_PAYLOAD(attributes, context.
intent, context.transactionType)
   targetNodes = IDENTIFY_RELEVANT_NODES(context.transactionType)
   FOR EACH node IN targetNodes
      response = SEND_WEBHOOK(node.endpoint, payload)
      IF response.status == SUCCESS
         nodeResponses [node.id] = PARSE_JSON_RESPONSE(response.data)
      END IF
   END FOR
   RETURN nodeResponses
```

```
// Generate Hash-Based Security Token
FUNCTION GenerateSecurityToken(attributes)
   securityToken = CREATE_SECURITY_TOKEN( )
   FOR EACH attribute IN attributes
      hashAddress = COMPUTE_HASH(attribute.name + attribute.value)
      securityToken.attributeTable[hashAddress] = attribute
      securityToken.hashRange[hashAddress] = ASSIGN_ADDRESS_
RANGE(attribute)
   END FOR
   DISTRIBUTE_TOKEN_TO_NODES(securityToken)
   securityTokens[securityToken.id] = securityToken
   RETURN securityToken
```

```
// Distribute Security Token to Nodes
FUNCTION DistributeTokenToNodes(securityToken)
   FOR EACH node IN networkNodes
      nodeAddressRange = SELECT_ADDRESS_RANGE(node)
      IF INTERSECTS(nodeAddressRange, securityToken.hashRange)
         SEND_TOKEN_TO_NODE(node, securityToken)
      END IF
```

-continued

```
  END FOR
  RECORD_TOKEN_DISTRIBUTION_ON_LEDGER(securityToken)
  RETURN SUCCESS
```

```
// Assemble Content with Smart Contracts
FUNCTION AssembleContent(nodeResponses, context)
  smartContract = SELECT_SMART_CONTRACT(context.
transactionType)
  IF smartContract IS NULL
    smartContract = CREATE_NEW_SMART_CONTRACT(context)
    ADD smartContract TO smartContracts
  END IF
  contentRules = EXTRACT_RULES(smartContract)
  contentParameters = EXTRACT_PARAMETERS(smartContract)
  jsonContent = INITIALIZE_JSON_OBJECT( )
  FOR EACH response IN nodeResponses
    attributes = response.attributes
    FOR EACH attribute IN attributes
      IF VALIDATE_ATTRIBUTE(attribute, contentRules)
        jsonContent[attribute.name] = attribute.value
      END IF
    END FOR
  END FOR
  RECORD_JSON_ON_LEDGER(jsonContent)
  RETURN jsonContent
```

```
// Generate Dynamic Electronic Form
FUNCTION GenerateElectronicForm(jsonContent, device, context)
  formTemplate = INITIALIZE_FORM_TEMPLATE(context.transactionType)
  genAIParameters = LOAD_GEN_AI_FORM_PARAMETERS( )
  FOR EACH attribute IN jsonContent
    formField = CREATE_FORM_FIELD(attribute.name, attribute.value)
    IF HAS_PREPOPULATED_DATA(attribute)
      formField.value = FETCH_PREPOPULATED_DATA(attribute)
    END IF
    ADD formField TO formTemplate
  END FOR
  formSecurity = APPLY_SECURITY_RULES(jsonContent, formTemplate)
  dynamicForm = RENDER_FORM_ON_DEVICE(formTemplate,
device, genAIParameters)
  RETURN dynamicForm
```

```
// Mint NFT for Filled Form
FUNCTION MintNFT(filledForm, attributes)
  nft = CREATE_NFT( )
  nft.tokenId = GENERATE_UNIQUE_ID( )
  nft.attributes = attributes
  nft.creationTime = GET_CURRENT_TIMESTAMP( )
  nft.validityPeriod = DETERMINE_VALIDITY_PERIOD(filledForm.
transactionType)
  RECORD_NFT_ON_LEDGER(nft)
  mintedNFTs.ADD(nft)
  RETURN nft
```

```
// Process Filled Form as NFT
FUNCTION ProcessFormAsNFT(nft, securityToken)
  FOR EACH node IN networkNodes
    IF NODE_REQUIRES_DATA(nft.transactionType,
node.platformType)
      nodeAttributes = EXTRACT_ATTRIBUTES(nft, securityToken)
      SEND_NFT_TO_NODE(node, nft, nodeAttributes)
      response = RECEIVE_NODE_PROCESSING_RESULT(node)
      IF response.status == SUCCESS
        UPDATE_LEDGER_WITH_PROCESSING_RESULT(nft,
node, response)
```

-continued

```
      END IF
    END IF
  END FOR
  RETURN PROCESSING STATUS
```

```
// Validate Temporal Properties
FUNCTION ValidateTemporalProperties(nft)
  currentTime = GET_CURRENT_TIMESTAMP( )
  IF currentTime > nft.creationTime + nft.validityPeriod
    SET_NFT_STATUS(nft, "passive")
    NOTIFY_NODES_OF_PASSIVE_STATUS(nft)
  ELSE
    SET_NFT_STATUS(nft, "active")
  END IF
  RECORD_STATUS_ON_LEDGER(nft)
  RETURN nft.status
```

```
// Main Workflow
FUNCTION Main( )
  InitializeDistributedLedger( )
  device = DETECT_USER_DEVICE( )
  inputType = DETERMINE_INPUT_TYPE(device)
```

-continued

```
  attributes = CaptureCustomerPrompt(device, inputType)
  context = AnalyzePromptWithGenAI(attributes)
  nodeResponses = TriggerWebhook(attributes, context)
  securityToken = GenerateSecurityToken(attributes)
  jsonContent = AssembleContent(nodeResponses, context)
  dynamicForm = GenerateElectronicForm(jsonContent, device, context)
  filledForm = COLLECT_USER_INPUT(dynamicForm)
  nft = MintNFT(filledForm, attributes)
  processingStatus = ProcessFormAsNFT(nft, securityToken)
  nftStatus = ValidateTemporalProperties(nft)
  RETURN processingStatus, nftStatus
// Explanation of Pseudocode
```

The pseudocode outlines sample systems and processes for generating and processing electronic content in a decentralized finance network, leveraging distributed ledger technology, generative artificial intelligence, hash-based security, smart contracts, and non-fungible tokens. It begins by defining essential data structures, including Attribute to store data elements with their names, values, and hash addresses; SecurityToken to manage hash-based security tables; SmartContract to encapsulate transaction rules and workflows; NFT to represent minted data with temporal properties; and Node to model network participants. Global variables maintain lists and maps for nodes, security tokens, minted NFTs, and smart contracts, ensuring centralized access to critical components. The InitializeDistributedLedger function sets up the network by creating nodes for predefined entities, such as financial institutions or regulatory bodies, and initializing empty collections for tokens, NFTs, and contracts, establishing the foundation for the decentralized ecosystem.

The CaptureCustomerPrompt function handles user input from devices like smartphones or spatial computing platforms, supporting multiple input types such as voice, text, or other modalities. It converts voice inputs to text using speech recognition, reads text directly, or processes other inputs, then uses generative artificial intelligence to analyze the prompt and extract relevant attributes. The AnalyzePromptWithGenAI function employs a generative artificial intelligence model to classify the prompt's intent, determine the transaction type (e.g., loan application or account opening), and map the intent to required attributes. This analysis ensures that the system understands the context of the user's request, enabling tailored data collection and processing.

The TriggerWebhook function facilitates communication with distributed nodes by creating a JSON payload containing the extracted attributes, intent, and transaction type. It identifies relevant nodes based on the transaction type, such as lending or claims processing platforms, and sends the payload via webhook calls. Responses from nodes are parsed into structured data, aggregating contributions from multiple entities. This distributed approach ensures that the system can handle complex transactions requiring input from various network participants, maintaining interoperability and scalability.

The GenerateSecurityToken function implements attribute-level security by creating a hash-based security token. For each attribute, it computes a unique hash address using the attribute's name and value, assigns a distributed hash table range, and stores the attribute in the token's table. The token is distributed to nodes via the DistributeTokenToNodes function, which selects address ranges for each node and sends the token to those with overlapping ranges, recording the distribution on the ledger. This mechanism ensures that sensitive data is protected at the attribute level, preventing unauthorized access or tampering as it moves through the network.

The AssembleContent function coordinates the creation of electronic content by selecting or creating a smart contract based on the transaction type. It extracts rules and parameters from the smart contract, validates node responses against these rules, and constructs a JSON object containing the validated attributes. The JSON is recorded on the ledger, ensuring transparency and immutability. This structured format allows seamless integration with various applications and platforms, accommodating diverse data standards within the network.

The GenerateElectronicForm function uses generative artificial intelligence to render a dynamic form on the user's device. It initializes a form template based on the transaction type, loads generative artificial intelligence parameters, and creates fields for each attribute in the JSON content. Prepopulated data is fetched for known attributes, and security rules are applied to protect the form's integrity. The form is rendered on the device, providing an intuitive interface for user input. This dynamic generation eliminates the need for static templates, adapting to the specific context of each prompt.

The MintNFT function secures the filled form by creating a non-fungible token with a unique identifier, storing the form's attributes, creation time, and validity period. The token is recorded on the ledger and added to the minted NFTs list, ensuring data integrity and ownership. The ProcessFormAsNFT function transmits the NFT to relevant nodes, which use the security token to interpret its attributes and process the transaction. Node responses are recorded on the ledger, updating the transaction status and ensuring traceability.

The ValidateTemporalProperties function manages the NFT's validity by comparing the current time to the token's creation time and validity period. If expired, the NFT is marked as passive, and nodes are notified; otherwise, it remains active. The status is recorded on the ledger, ensuring that entities rely on current data. This feature accommodates dynamic financial environments where information may change frequently.

The Main function orchestrates the workflow, initializing the ledger, detecting the user's device, capturing and analyzing the prompt, triggering webhooks, generating security tokens, assembling content, rendering the form, minting the NFT, processing the transaction, and validating temporal properties. It returns the processing status and NFT status, providing a complete execution path for the system. This integrated workflow ensures that all components work cohesively to deliver a secure and efficient solution for decentralized finance transactions.

The systems and methods described in the disclosure for generating and processing electronic content in decentralized finance networks using distributed ledger technology, generative artificial intelligence, hash-based security, smart contracts, and non-fungible tokens can be adapted through various alternatives, modifications, combinations, and customizations while remaining within the spirit and scope of the disclosure. One alternative involves modifying the input modalities for capturing customer prompts. Instead of relying solely on voice, text, or other device-based inputs, the system could integrate additional input methods, such as gesture-based controls, to accommodate diverse user preferences and emerging technologies. These alternative input methods would still trigger the same generative artificial intelligence analysis and attribute extraction processes, ensuring that the system captures the necessary data in a structured format for processing.

Another modification could involve the generative artificial intelligence model used for prompt analysis and form generation. While the disclosure describes a single generative artificial intelligence model, the system could employ a modular architecture where different artificial intelligence models are selected based on the transaction type or complexity. For instance, a transformer-based model might be used for text-heavy prompts, while a multimodal model could process combined voice and visual inputs. This customization would maintain the dynamic generation of electronic forms while optimizing performance for specific use cases, aligning with the disclosure's goal of adapting to varied customer needs.

The hash-based security mechanism could be customized by adopting alternative cryptographic techniques. Instead of using a distributed hash table, the system could implement zero-knowledge proofs or homomorphic encryption to secure attributes at the granular level. These alternatives would still provide attribute-level security and prevent unauthorized access, but they could offer enhanced privacy or computational efficiency depending on the network's requirements. Such modifications would preserve the disclosure's emphasis on secure data handling within a decentralized environment.

The webhook-based communication model could be modified to support other inter-node communication protocols, such as message queues or peer-to-peer messaging. For example, a publish-subscribe model could replace webhook calls, allowing nodes to subscribe to specific transaction types and receive payloads asynchronously. This customization would maintain real-time coordination among distributed nodes while potentially improving scalability in networks with high transaction volumes, staying within the scope of facilitating efficient data exchange in decentralized finance systems.

The JSON format used for assembling content could be replaced with other structured data formats, such as XML or YAML, depending on the network's interoperability needs. These alternatives would still enable standardized representation of attributes and security properties, ensuring seamless integration across diverse platforms. This modification would align with the disclosure's objective of maintaining data consistency and interpretability in a distributed ledger environment.

Smart contracts could be customized to incorporate additional logic or governance models. For instance, the system could implement multi-signature smart contracts requiring approval from multiple nodes before executing a transaction, enhancing security for high-value transactions. Alternatively, smart contracts could include machine learning-based decision rules to adapt workflows dynamically based on historical transaction data. These customizations would preserve the role of smart contracts in managing transaction parameters and workflows, as outlined in the disclosure.

The rendering of electronic forms on user devices could be modified to support different user interfaces. Instead of traditional form-based interfaces, the system could generate conversational interfaces powered by chatbots or augmented reality overlays for spatial computing devices. These alternatives would still present attributes in a structured and user-friendly manner, ensuring accurate data collection while enhancing user experience, which is consistent with the disclosure's user-centric design.

The non-fungible token minting process could be adapted to use alternative token standards, such as ERC-1155 instead of ERC-721, to support batch minting for multiple transactions. This modification would maintain the integrity and ownership of customer data while improving efficiency in networks with frequent token creation. Additionally, the system could integrate token burning mechanisms to remove expired non-fungible tokens from the ledger, optimizing storage without compromising the disclosure's focus on data traceability.

The temporal validity feature could be customized to support variable validity periods based on transaction type or regulatory requirements. For example, know-your-customer data might have a one-year validity, while loan application data could be valid for only 30 days. The smart contract could also allow users to extend validity periods under specific conditions, such as providing updated information. This customization would align with the disclosure's emphasis on managing dynamic data in financial environments.

The system's support for both individual and entity-level users could be expanded to include hybrid users, such as consortiums or temporary alliances of entities. These hybrid users could initiate prompts requiring coordinated input from multiple parties, with the system generating composite electronic forms that aggregate their requirements. This modification would extend the disclosure's flexibility to support complex inter-organizational workflows while maintaining security and efficiency.

The autofill capability could be enhanced by integrating external data sources, such as public registries or third-party verification services, to prepopulate fields with verified information. For instance, the system could fetch a user's address from a government database or business details from a corporate registry. This customization would reduce user effort while ensuring data accuracy, aligning with the disclosure's goal of streamlining data submission.

The distributed ledger technology could be modified to use alternative blockchain protocols, such as Hyperledger Fabric or Corda, instead of Ethereum-based ledgers. These alternatives would still provide transparency, immutability, and efficient data sharing, but they could offer improved privacy or performance for specific use cases. This modification would remain within the scope of leveraging distributed ledger technology for decentralized finance applications.

The system could be combined with additional security layers, such as biometric authentication for user prompts or end-to-end encryption for webhook payloads. These combinations would enhance the system's security without altering its core functionality, ensuring that sensitive data remains protected throughout the transaction process, as emphasized in the disclosure.

The invention could be customized to support non-financial use cases within decentralized networks, such as supply chain management or digital identity verification. For example, the system could generate electronic forms for tracking goods or verifying user credentials, using the same generative artificial intelligence, security tokens, and non-fungible tokens. This adaptation would extend the disclosure's principles to other distributed systems while maintaining its core mechanisms.

The system could integrate with off-chain storage solutions, such as InterPlanetary File System, to store large electronic forms or non-fungible token metadata, reducing on-chain storage costs. The distributed ledger would still record references to the off-chain data, ensuring traceability and integrity. This modification would optimize performance while adhering to the disclosure's focus on secure and transparent data management.

The generative artificial intelligence could be combined with reinforcement learning to improve form generation over time. By analyzing user interactions and transaction outcomes, the system could refine its attribute selection and form design, enhancing usability and efficiency. This combination would align with the disclosure's goal of dynamic and adaptive content generation.

The system could be modified to support cross-chain interoperability, allowing non-fungible tokens and smart contracts to operate across multiple blockchain networks. For instance, a loan application initiated on one blockchain could be processed on another, with the system coordinating data exchange via cross-chain bridges. This customization would enhance the system's scalability and applicability in heterogeneous decentralized finance ecosystems.

The invention could incorporate user feedback mechanisms, allowing customers to suggest improvements to the electronic forms or report issues. The generative artificial intelligence could analyze this feedback to adjust form designs or attribute requirements, improving user satisfaction while maintaining the disclosure's focus on user-centric data collection.

The system could be customized to support real-time auditing by integrating continuous monitoring tools that track non-fungible token creation, smart contract execution, and data processing. These tools would provide regulatory bodies with immediate access to transaction records, enhancing compliance without altering the system's core functionality, as envisioned in the disclosure.

The invention could be combined with decentralized identity protocols, such as self-sovereign identity, to verify user identities before processing prompts. This integration would enhance security and trust in the system, ensuring that only authorized users initiate transactions, while remaining within the scope of secure data handling in decentralized networks.

While the present technology has been explained through what are currently regarded as the most practical and preferred embodiments, it should be recognized that these specifics are provided solely for illustrative purposes, and the disclosure is not confined to the particular descriptions and embodiments outlined. Instead, it is intended to encompass modifications and comparable arrangements that fall within the spirit and scope of the appended claims. For instance, it is understood that the present technology envisions the possibility of integrating, where feasible, one or more elements from any given embodiment with one or more elements from any other embodiment.

The invention claimed is:

1. A method for generating and processing electronic content in a decentralized network, comprising:

capturing, by a user device, a customer prompt provided through an input modality, wherein the customer prompt specifies a transaction request;

analyzing, by a generative artificial intelligence module, the customer prompt to extract a set of attributes and determine a transaction type associated with the transaction request;

transmitting, via a webhook, a payload including the set of attributes and the transaction type to a plurality of distributed nodes in the decentralized network, wherein each node is associated with a platform configured to process a specific aspect of the transaction request;

optimizing network latency by prioritizing webhook payload transmission to the plurality of distributed nodes based on real-time blockchain consensus data;

generating, by a security module, a hash-based security token containing a distributed hash table mapping each attribute in the set of attributes to a unique hash address;

distributing, across the plurality of distributed nodes, the hash-based security token to enable attribute-level security for the set of attributes;

assembling, by a content assembly module, a JavaScript Object Notation (JSON) object containing the set of attributes based on responses from the plurality of distributed nodes and rules defined in a smart contract hosted on a distributed ledger;

generating, by the generative artificial intelligence module, a dynamic electronic form on the user device, wherein the dynamic electronic form includes fields corresponding to the set of attributes in the JSON object;

dynamically adjusting, by the generative artificial intelligence module, the dynamic electronic form with fields tailored to a user profile retrieved from the distributed ledger in real-time based on the transaction type;

receiving, via the user device, user input populating the fields of the dynamic electronic form;

minting, by a tokenization module, a non-fungible token representing the populated dynamic electronic form, wherein the non-fungible token includes the set of attributes and a validity period; and processing, by the plurality of distributed nodes, the non-fungible token to execute the transaction request using the hash-based security token to verify the set of attributes.

2. The method of claim 1, wherein the input modality includes at least one of voice input, text input, or gesture input, and the transaction request is a financial transaction request, and the decentralized network is a decentralized finance network.

3. The method of claim 2, further comprising:

classifying, by the generative artificial intelligence module, an intent of the customer prompt using a transformer-based neural network model fine-tuned on decentralized finance transaction data; and mapping the intent to the set of attributes required for the transaction type.

4. The method of claim 3, wherein the payload transmitted via the webhook further includes metadata specifying the intent of the customer prompt.

5. The method of claim 4, wherein generating the hash-based security token further comprises assigning a distributed hash table range to each attribute based on its data type.

6. The method of claim 5, wherein the smart contract defines workflow rules specifying a sequence of operations for processing the set of attributes.

7. The method of claim 6, further comprising:

prepopulating, by the generative artificial intelligence module, at least one field in the dynamic electronic form with data retrieved from the decentralized finance network; and validating user input against the prepopulated data.

8. The method of claim 7, wherein the validity period of the non-fungible token is determined based on the transaction type.

9. The method of claim 8, further comprising:

monitoring, by a validation module, a current timestamp against the validity period using a blockchain-based event listener that triggers real-time notifications to nodes; and transitioning the non-fungible token to a passive state in response to the validity period being exceeded.

10. The method of claim 9, wherein processing the non-fungible token further comprises recording transaction results on the distributed ledger.

11. A method for generating and processing electronic content in a decentralized finance network, comprising:

capturing, by a user device, a customer prompt provided through an input modality selected from voice input, text input, or gesture input, wherein the customer prompt specifies a financial transaction request;

analyzing, by a generative artificial intelligence module, the customer prompt to extract a set of attributes, classify an intent of the customer prompt, and determine a transaction type associated with the financial transaction request;

mapping, by the generative artificial intelligence module, the intent to the set of attributes required for the transaction type;

transmitting, via a webhook, a payload including the set of attributes, the transaction type, and metadata specifying the intent to a plurality of distributed nodes in the decentralized finance network, wherein each node is associated with a platform configured to process a specific aspect of the financial transaction request;

optimizing network latency by prioritizing webhook payload transmission to the plurality of distributed nodes based on real-time blockchain consensus data;

generating, by a security module, a hash-based security token containing a distributed hash table mapping each attribute in the set of attributes to a unique hash address, wherein a distributed hash table range is assigned to each attribute based on its data type;

distributing, across the plurality of distributed nodes, the hash-based security token to enable attribute-level security for the set of attributes;

assembling, by a content assembly module, a JavaScript Object Notation (JSON) object containing the set of attributes based on responses from the plurality of distributed nodes and workflow rules defined in a smart contract hosted on a distributed ledger, wherein the workflow rules specify a sequence of operations for processing the set of attributes;

generating, by the generative artificial intelligence module, a dynamic electronic form on the user device, wherein the dynamic electronic form includes fields corresponding to the set of attributes in the JSON object;

dynamically adjusting, by the generative artificial intelligence module, the dynamic electronic form with fields tailored to a user profile retrieved from the distributed ledger in real-time based on the transaction type;

prepopulating, by the generative artificial intelligence module, at least one field in the dynamic electronic form with data retrieved from the decentralized finance network;

validating, by the generative artificial intelligence module, user input against the prepopulated data;

receiving, via the user device, user input populating the fields of the dynamic electronic form;

minting, by a tokenization module, a non-fungible token representing the populated dynamic electronic form, wherein the non-fungible token includes the set of attributes and a validity period based on the transaction type;

monitoring, by a validation module, a current timestamp against the validity period;

dynamically adjusting, by the validation module, the validity period of the non-fungible token based on real-time regulatory requirements retrieved from the distributed ledger;

transitioning, by the validation module, the non-fungible token to a passive state in response to the validity period being exceeded;

processing, by the plurality of distributed nodes, the non-fungible token to execute the financial transaction request using the hash-based security token to verify the set of attributes;

recording, by the plurality of distributed nodes, transaction results on the distributed ledger; and notifying, by the validation module, the plurality of distributed nodes of the non-fungible token's passive state if transitioned.

12. A system for generating and processing electronic content in a decentralized finance network, comprising:

one or more processors;

one or more computer-readable memory devices storing processor-executable instructions that, when executed by the one or more processors, cause the one or more processors to:

capture a customer prompt provided through an input modality, wherein the customer prompt specifies a financial transaction request;

analyze the customer prompt to extract a set of attributes and determine a transaction type associated with the financial transaction request;

transmit a payload including the set of attributes and the transaction type to a plurality of distributed nodes in the decentralized finance network, wherein each node is associated with a platform configured to process a specific aspect of the financial transaction request;

optimize network latency by prioritizing payload transmission to the plurality of distributed nodes based on real-time blockchain consensus data;

generate a hash-based security token containing a distributed hash table mapping each attribute in the set of attributes to a unique hash address;

distribute the hash-based security token across the plurality of distributed nodes to enable attribute-level security for the set of attributes;

assemble a JavaScript Object Notation (JSON) object containing the set of attributes based on responses from the plurality of distributed nodes and rules defined in a smart contract hosted on a distributed ledger;

generate a dynamic electronic form on a user device, wherein the dynamic electronic form includes fields corresponding to the set of attributes in the JSON object;

dynamically adjust the dynamic electronic form with fields tailored to a user profile retrieved from the distributed ledger in real-time based on the transaction type;

employ a machine learning model trained on historical user interactions to optimize field placement and validation rules in the dynamic electronic form;

receive user input populating the fields of the dynamic electronic form;

mint a non-fungible token representing the populated dynamic electronic form, wherein the non-fungible token includes the set of attributes and a validity period; and process the non-fungible token across the plurality of distributed nodes to execute the financial transaction request using the hash-based security token to verify the set of attributes.

13. The system of claim 12, wherein the processor-executable instructions, when executed by the one or more processors, further cause the one or more processors to classify an intent of the customer prompt.

14. The system of claim 13, wherein the processor-executable instructions, when executed by the one or more processors, further cause the one or more processors to map the intent to the set of attributes required for the transaction type.

15. The system of claim 14, wherein the processor-executable instructions, when executed by the one or more processors, further cause the one or more processors to include metadata specifying a prioritized node routing sequence based on transaction type in the payload.

16. The system of claim 15, wherein the processor-executable instructions, when executed by the one or more processors, further cause the one or more processors to assign a distributed hash table range to each attribute based on its data type.

17. The system of claim 16, wherein the smart contract includes workflow rules specifying a sequence of operations for processing the set of attributes.

18. The system of claim 17, the processor-executable instructions, when executed by the one or more processors, further cause the one or more processors to prepopulate at least one field in the dynamic electronic form with data retrieved from the decentralized finance network.

19. The system of claim 18, wherein the processor-executable instructions, when executed by the one or more processors, further cause the one or more processors to determine the validity period of the non-fungible token based on the transaction type.

20. The system of claim 19, the processor-executable instructions, when executed by the one or more processors, further causing the one or more processors to:

monitor a current timestamp against the validity period of the non-fungible token;

transition the non-fungible token to a passive state in response to the validity period being exceeded;

notify the plurality of distributed nodes of the non-fungible token's passive state;

record transaction results on the distributed ledger;

validate user input against prepopulated data in the dynamic electronic form;

adapt validation rules in real-time based on machine learning analysis of node response patterns;

apply field-specific validation rules derived from the smart contract to ensure accuracy of user input;

receive responses from the plurality of distributed nodes confirming receipt of the hash-based security token; and verify the integrity of the non-fungible token by comparing its attributes against the hash-based security token before executing the financial transaction request.

* * * * *